United States Patent
Ichikawa

(10) Patent No.: US 9,091,542 B2
(45) Date of Patent: *Jul. 28, 2015

(54) SENSOR ELEMENT, METHOD FOR MANUFACTURING SENSOR ELEMENT, SENSOR DEVICE, AND ELECTRONIC APPARATUS

(75) Inventor: Fumio Ichikawa, Ebina (JP)

(73) Assignee: Seiko Epson Corporation (JP)

( * ) Notice: Subject to any disclaimer, the term of this patent is extended or adjusted under 35 U.S.C. 154(b) by 341 days.

This patent is subject to a terminal disclaimer.

(21) Appl. No.: 13/611,532

(22) Filed: Sep. 12, 2012

(65) Prior Publication Data

US 2013/0081474 A1 Apr. 4, 2013

(30) Foreign Application Priority Data

Sep. 29, 2011 (JP) ................................. 2011-214427

(51) Int. Cl.
G01C 19/56 (2012.01)
G01C 19/5621 (2012.01)
G01C 19/5607 (2012.01)
G01C 19/5719 (2012.01)

(52) U.S. Cl.
CPC ........ G01C 19/5621 (2013.01); G01C 19/5607 (2013.01); G01C 19/5719 (2013.01)

(58) Field of Classification Search
USPC .............. 73/504.16, 504.12, 504.04; 310/370
See application file for complete search history.

(56) References Cited

U.S. PATENT DOCUMENTS

| 4,954,741 | A | 9/1990 | Furutsu et al. | |
| 5,343,749 | A | 9/1994 | Macy | |
| 5,522,249 | A | 6/1996 | Macy | |
| 5,866,816 | A | 2/1999 | Hulsing, II | |
| 6,490,925 | B2 * | 12/2002 | Inoue et al. | 73/504.16 |
| 7,216,540 | B2 * | 5/2007 | Inoue et al. | 73/504.16 |
| 7,528,533 | B2 * | 5/2009 | Ochi et al. | 310/370 |
| 7,975,546 | B2 * | 7/2011 | Noguchi et al. | 73/504.16 |
| 8,701,487 | B2 * | 4/2014 | Naruse et al. | 73/504.12 |
| 2012/0126664 | A1 | 5/2012 | Ogura et al. | |
| 2013/0074597 | A1 * | 3/2013 | Ichikawa | 73/504.15 |
| 2013/0081473 | A1 * | 4/2013 | Ichikawa | 73/658 |
| 2013/0283910 | A1 * | 10/2013 | Nishizawa et al. | 73/504.12 |

(Continued)

FOREIGN PATENT DOCUMENTS

| JP | 05-256723 | 10/1993 |
| JP | 08-327366 | 12/1996 |
| JP | 10-078326 | 3/1998 |
| JP | 2006-054602 | 2/2006 |
| JP | 2008-014887 | 1/2008 |

(Continued)

*Primary Examiner* — Helen Kwok
(74) *Attorney, Agent, or Firm* — Harness, Dickey & Pierce, P.L.C.

(57) ABSTRACT

A sensor element includes a base part, drive vibration arms that extend from the base part, an adjustment vibration arm 241 that extends from the base part and vibrates in response to drive vibration of the drive vibration arms, detection electrodes that output a signal according to a physical quantity applied to the drive vibration arms, and adjustment electrodes 551 and 553 provided on the adjustment vibration arm 241 and electrically connected to the detection electrodes for outputting a charge in a reverse polarity with respect to the detection electrodes in response to vibration of the adjustment vibration arm 241. The adjustment electrode 551 has a common part 60 electrically connected to the detection electrodes and a plurality of branch parts 61 branching out from the common part 60 and arranged side by side along an extension direction of the adjustment vibration arm 241.

13 Claims, 20 Drawing Sheets

(56) References Cited

U.S. PATENT DOCUMENTS

2013/0285508 A1* 10/2013 Nakagawa ............... 310/323.21
2013/0320812 A1* 12/2013 Yamaguchi et al. .......... 310/348

FOREIGN PATENT DOCUMENTS

| JP | 2008-209215 | 9/2008 |
| JP | 2012-112748 | 6/2012 |

* cited by examiner

SENSOR ELEMENT, METHOD FOR MANUFACTURING SENSOR ELEMENT, SENSOR DEVICE, AND ELECTRONIC APPARATUS

BACKGROUND

1. Technical Field

The present invention relates to sensor elements, methods for manufacturing a sensor element, sensor devices and electronic apparatuses.

2. Related Art

Angular velocity sensors (vibration gyro sensors) have been known (see, for example, JP-A-2008-14887 (Patent Document 1)) as sensor elements that are used for body control in vehicles, self-position detection of car navigation systems, vibration control and compensation systems (such as, shake compensation) for digital cameras, digital video cameras, and the like, and detect physical quantity, such as, angular velocity, acceleration and the like. For example, an angular velocity sensor described in Patent Document 1 has a tuning-fork element formed from two arms and a connection section that connects one ends of these two arms. Also, in the angular velocity sensor described in Patent Document 1, the tuning-fork element is formed from non-piezoelectric material, and each of the arms is provided with a driving section made of a pair of electrodes and a piezoelectric thin film sandwiched there the electrodes and a detecting section.

In the angular velocity sensor described in Patent Document 1, a voltage is applied between the pair of electrodes of the driving section, thereby flexurally vibrating (driving) the arms. In this driving state, when the arms receive an angular velocity about their axis extending along the arm's longitudinal direction, the arms bend in a direction orthogonal to the driving direction due to Coriolis force, and a charge according to the amount of the bend is detected by the pair of electrodes. The angular velocity can be detected based on the detected charge.

The tuning-fork element having the two arms described above may generally be formed by etching a substrate. However, it is difficult to obtain dimensions of the tuning-fork element precisely according to the design due to etching anisotropy of the substrate, variations in working process, and the like. As a result, the tuning-fork may be formed into a shape that is not originally intended, such that the arms may bend in a direction that is different from the driving direction, even when an angular velocity is not applied to the arms. If a charge that is generated by the pair of electrodes at the detecting section, which may be caused by such bending of the arms, is detected, the detection accuracy would be deteriorated.

Therefore, according to the angular velocity sensor described in Patent Document 1, a portion of one of the pair of electrodes at the detecting section 1 is removed, thereby adjusting the amount of charge to be outputted from the pair of electrodes at the detection section in the state where no angular velocity is applied to the arms. However, according to the angular velocity sensor described in Patent Document 1, it is difficult to make highly accurate adjustment of the amount of charge to be outputted from the pair of electrodes at the detection section.

SUMMARY

In accordance with some aspects of the invention, sensor elements that can readily and reliably exhibit excellent detection sensitivity, methods for manufacturing such sensor elements, sensor devices using such sensor elements can be provided. Also, highly reliable electronic apparatuses equipped with such a sensor device can be provided.

An advantage of some aspects of the invention is to solve at least a part of the problem described above, and the invention can be implemented as the following embodiments and application examples.

Application Example 1

A sensor element in accordance with an embodiment of the invention includes: a base part; a drive vibration arm for drive vibration that extends from the base part; a vibration arm that extends from the base part and vibrates in response to drive vibration of the drive vibration arm; and a detection part including a detection electrode that outputs a signal according to a physical quantity applied to the drive vibration arm, the vibration arm having an electrode that is electrically connected to the detection electrode and generates a charge in a reverse polarity with respect to a charge to be generated from the detection electrode when no physical quantity is applied to the drive vibration arm, and the electrode including a common part provided along an extension direction of the vibration arm and plural branch parts branching out from the common part. The sensor element thus configured has the electrode provided on the vibration arm generate a charge in reverse polarity against a leakage output of the detection electrode that may be generated due to cross-sectional asymmetry of the drive vibration arm, thereby cancelling out the leakage output, which can be outputted as a sensor output.

By cutting at least one branch part midway among the plural branch parts of the electrode or the common part midway, the charge to be generated from the electrode can be reduced, and thus the sensor output can be adjusted. More specifically, the sensor output can be adjusted (corrected) such that the sensor output in the state in which no physical quantity is applied to the sensor element becomes a desired reference value (for example, zero).

In particular, the plural of branch parts branch out from the common part, such that, even when any arbitrary one of the branch parts is cut off, the remaining portion of the branch parts can maintain their electrically connected state with the detection electrode. In other words, the electrode area of the electrode can be reduced by the amount of the arbitrary one cut among the plural branch parts. Further, the plural branch parts are arranged side by side along the extension direction of the vibration arm, such that the sensor output can be readily and highly accurately adjusted according to the position and the number of the branch parts to be cut. Accordingly, the sensor element in accordance with the embodiment of the invention can readily and securely exhibit excellent detection sensitivity.

Application Example 2

In the sensor element in accordance with an aspect of the invention, it is preferred that each of the plural branch parts may have an electrode width greater on the side of a tip portion thereof than on the side of the common part. Accordingly, the electrode can secure a large electrode area before adjustment (before the common part or the branch parts are cut midway), a wide adjustment range can be secured for adjusting the sensor output through cutting off the common part or the branch parts midway, and mid portions of the branch parts can be cut with relative ease.

Application Example 3

In the sensor element in accordance with an aspect of the invention, it is preferred that the plural branch parts may have mutually different electrode areas. Therefore, adjustment of the amount of charge generated from the electrode can be readily performed. More specifically, the amount of charge according to each of the electrode areas may be calculated in advance, and a portion of the branch parts corresponding to a charge amount equivalent to the amount of charge of leakage output of the detection electrode may be cut, whereby the adjustment can be accurately conducted.

Application Example 4

In the sensor element in accordance with an aspect of the invention, it is preferred that the plural branch parts may be inclined with respect to the extension direction of the vibration arm. Accordingly, mid portions of the branch parts can be readily cut. More specifically, when cutting the branch parts by a laser beam, the branch parts can be cut by moving the laser beam in either the X-axis direction or the Y-axis direction. Accordingly, it is not necessary to consider the orientation of the sensor element to be disposed with respect to the laser beam, such that the manufacturing efficiency can be improved.

Application Example 5

In the sensor element in accordance with an aspect of the invention, it is preferred that the plural branch parts may branch out on both sides of the common part. By this structure, the common part can be prevented or suppressed from functioning as the adjustment electrode. Accordingly, adjustment of the sensor output can be readily performed. Also, the adjustment electrode before adjustment (before the common part or the branch parts are cut midway) can secure a large electrode area.

Application Example 6

In the sensor element in accordance with an aspect of the invention, the vibration arm may preferably have a first surface, a second surface on the opposite side of the first surface, and a side surface connecting the first surface and the second surface, and the electrode may preferably have the common part and the plural branch parts provided on at least one of the first surface and the second surface, and a side surface electrode provided on the side surface. A second electrode may be disposed opposite to tip portions of at least a plurality of the branch parts of a first electrode such that the charge to be generated between the branch parts and the second electrode can be used for charge adjustment.

Application Example 7

In the sensor element in accordance with an aspect of the invention, the vibration arm may have a groove portion provided along the extension direction thereof, and at least a portion of the plural branch parts may preferably be provided on a wall surface of the groove part. Accordingly, the distance between the branch parts of the electrode and adjacent electrodes becomes shorter, such that the charge to be outputted from the electrode can be made greater. Therefore, the range of adjustment of the sensor output can be made wider.

Application Example 8

In the sensor element in accordance with an aspect of the invention, the common part and the plural branch parts may be provided on each of the first surface and the second surface, and the plural branch parts provided on the first surface and the plural branch parts provided on the second surface may preferably be disposed so as not to overlap each other in at least a portion thereof, as viewed in a normal direction to the first surface. Accordingly, the branch parts provided on the top surface of the vibration arm and the branch parts provided on the rear surface of the vibration arm can be cut independently from each other by using a laser beam. Therefore, the sensor output can be adjusted with much higher accuracy.

Application Example 9

In the sensor element in accordance with an aspect of the invention, it is preferred that the detection part may have a detection vibration arm that extends from the base part, and vibrates according to a physical quantity applied to the drive vibration arm, and the detection electrode may be provided on the detection vibration arm. Accordingly, the detection electrode can secure a large electrode area. Therefore, the detection sensitivity of the sensor element can be improved.

Application Example 10

Another embodiment of the invention pertains to a method for manufacturing a sensor element. The sensor element includes a base part; a drive vibration arm for drive vibration that extends from the base part; a vibration arm that extends from the base part and vibrates in response to drive vibration of the drive vibration arm; and a detection part including a detection electrode that outputs a signal according to a physical quantity applied to the drive vibration arm. The vibration arm has an electrode that is electrically connected to the detection electrode and generates a charge in a reverse polarity with respect to a charge generated from the detection electrode when no physical quantity is applied to the drive vibration arm, and the electrode includes a common part provided along an extension direction of the vibration arm and a plural of branch parts branching out from the common part. In accordance with an aspect of the embodiment, the method includes adjusting the charge to be generated at the electrode by cutting the plural branch parts midway or the common part midway. According to the method for manufacturing a sensor element, excellent detection sensitivity can be readily and securely exhibited.

Application Example 11

In the method for manufacturing a sensor element in accordance with an aspect of the invention, it is preferred that the method may include, before performing the charge adjustment, measuring a charge generated at the detection electrode in a state in which the drive vibration arm is vibrated by energization without applying a physical quantity to the drive vibration arm, and adjusting the resonance frequency of the vibration arm. Accordingly, excellent detection sensitivity can be readily and securely exhibited.

Application Example 12

A sensor device in accordance with an embodiment of the invention includes the sensor element in accordance with one of the aspects described above, a circuit for driving the drive vibration arm, and a circuit for detecting an output from the detection electrode. Accordingly, a sensor device with excellent detection sensitivity can be provided at low cost.

Application Example 13

An electronic apparatus in accordance with an embodiment of the invention has the sensor element in accordance with at least one of the aspects described above. Accordingly, an electronic apparatus having excellent reliability can be provided.

DESCRIPTION OF EXEMPLARY EMBODIMENTS

Sensor elements, characteristic adjustment methods for the sensor elements, sensor devices and electronic apparatuses in accordance with embodiments of the invention will be described below with reference to the accompanying drawings.

First Embodiment

Figure 1:
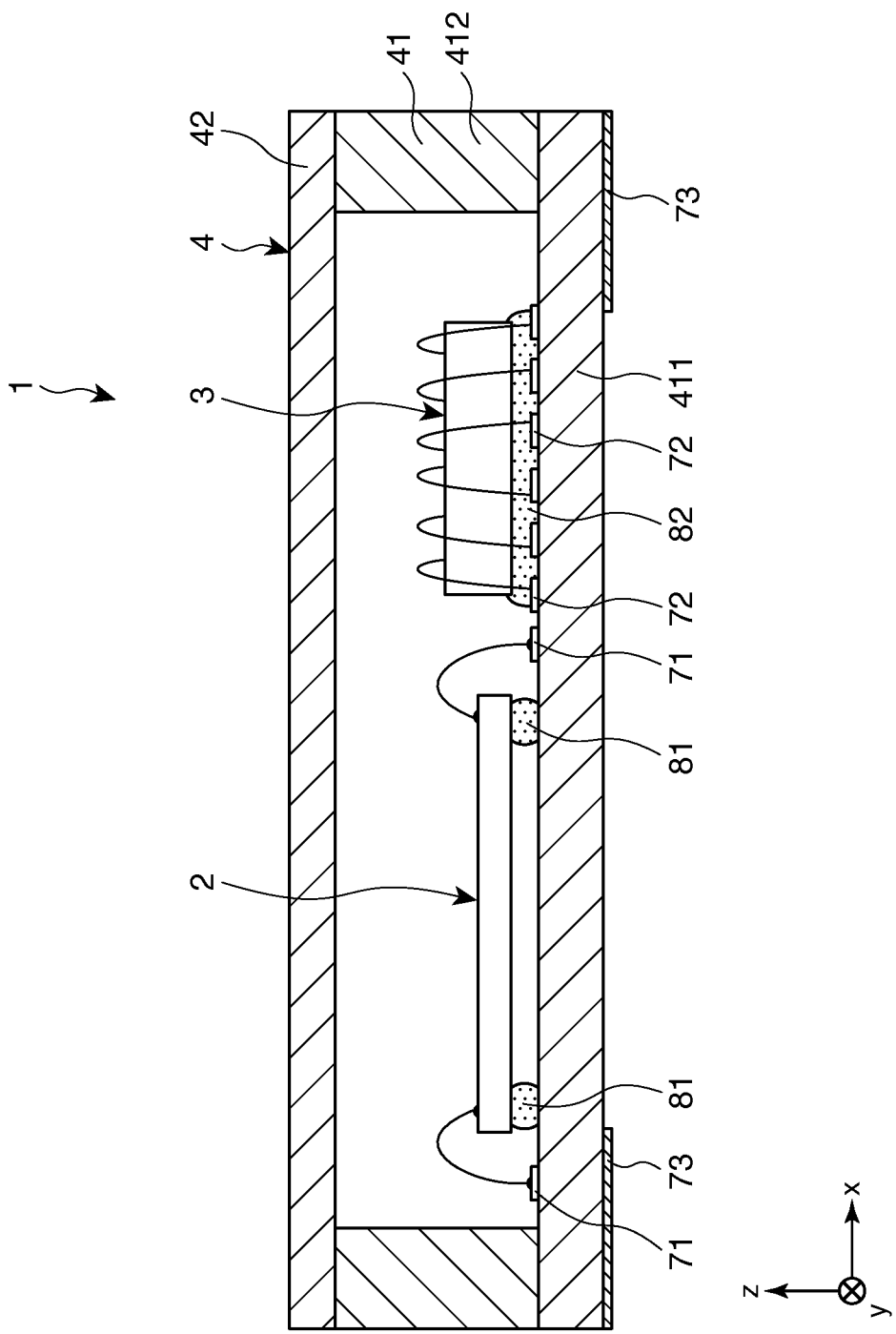
FIG. 1 is a schematic cross-sectional view briefly showing the composition of a sensor device (an electronic device) in accordance with a first embodiment of the invention.
Figure 2:
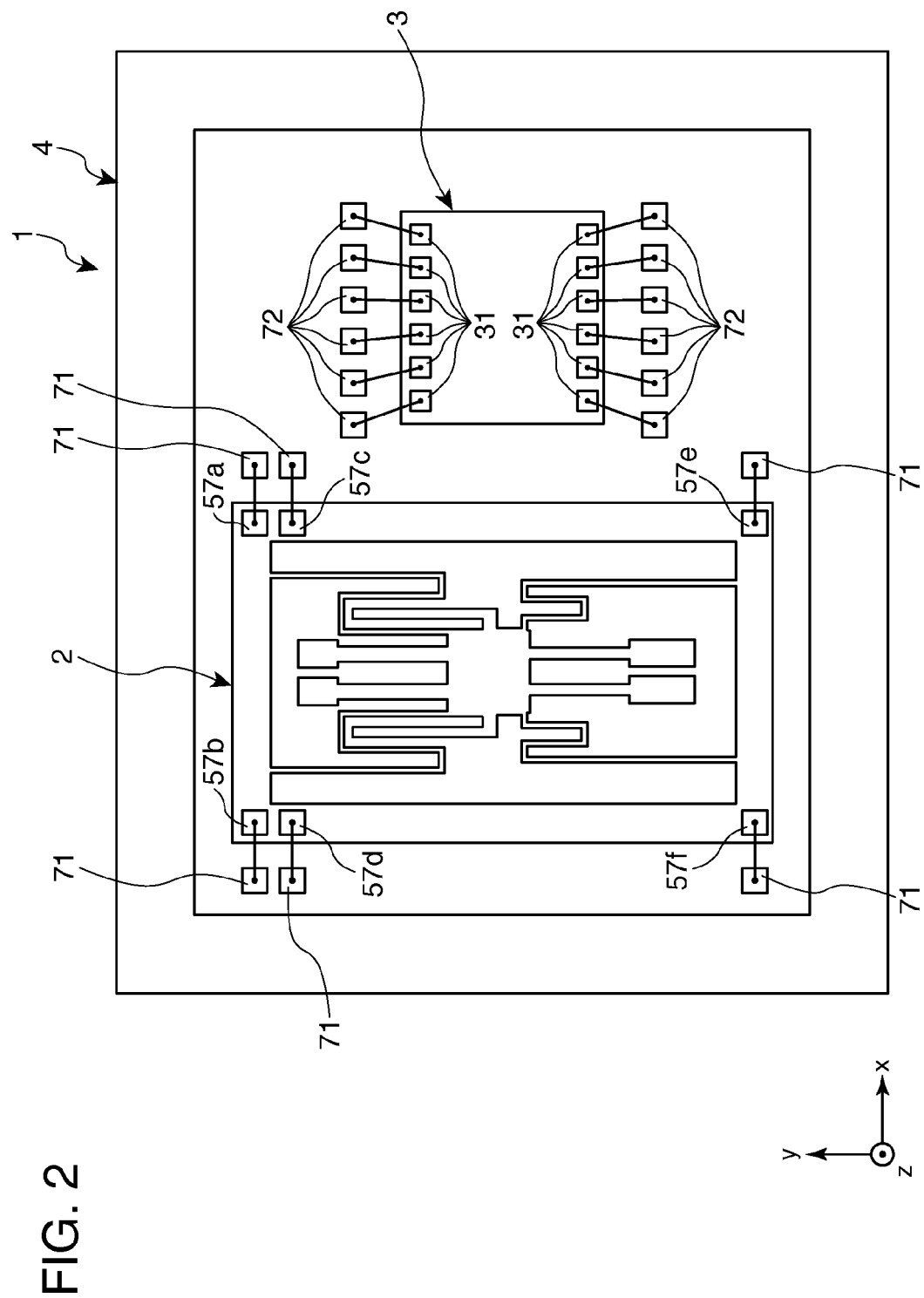
FIG. 2 is a plan view of the sensor device shown in FIG. 1.
Figure 3:
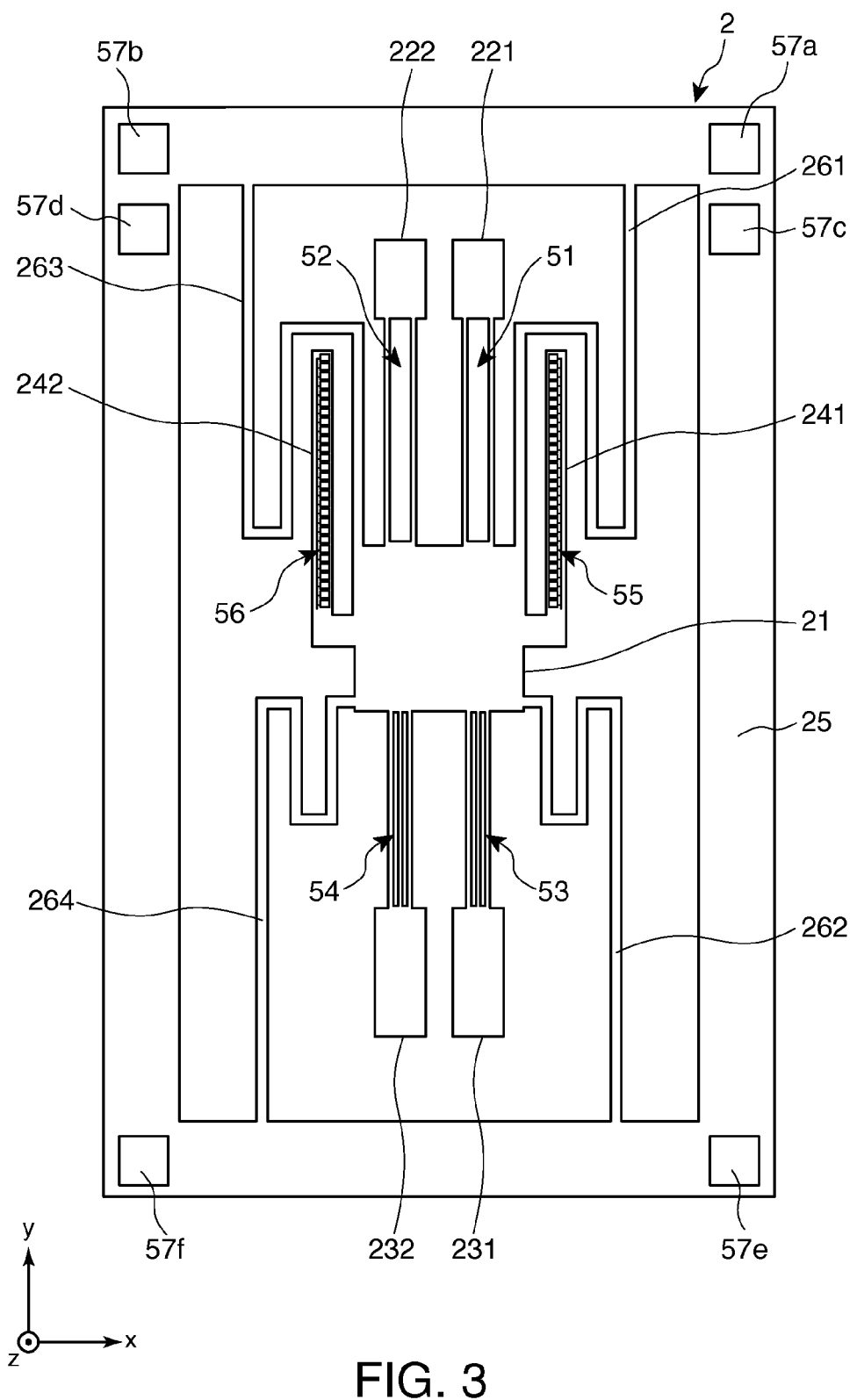
FIG. 3 is a plan view showing a sensor element provided in the sensor device shown in FIG. 1.
Figure 4A:
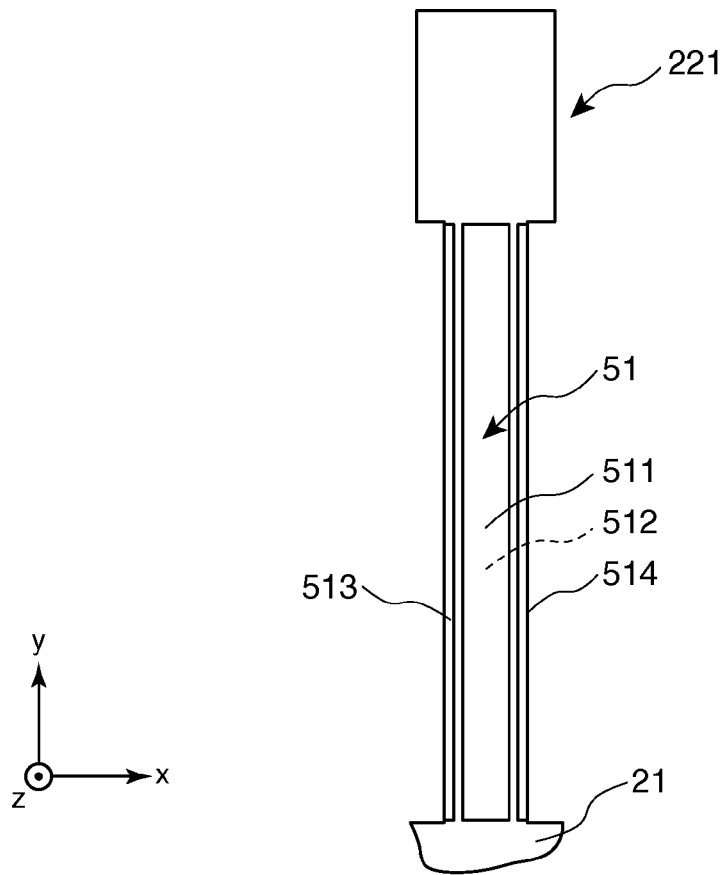
FIG. 4A is an enlarged plan view of a drive vibration arm of the sensor element shown in FIG. 3.
Figure 4B:
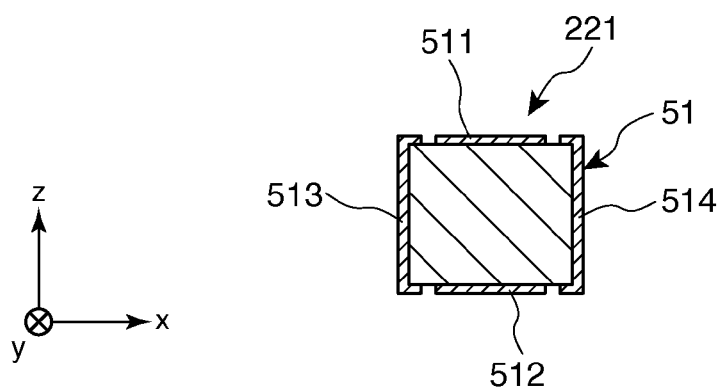
FIG. 4B is a cross-sectional view of the drive vibration arm shown in FIG. 4A.
Figure 5A:
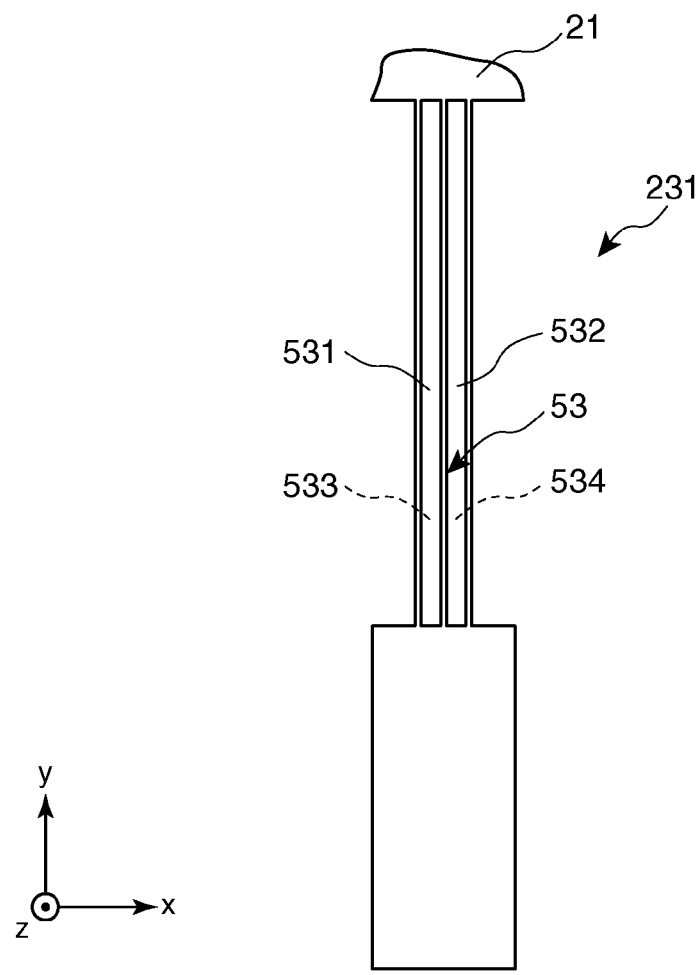
FIG. 5A is an enlarged plan view of a detection vibration arm of the sensor element shown in FIG. 3.
Figure 5B:
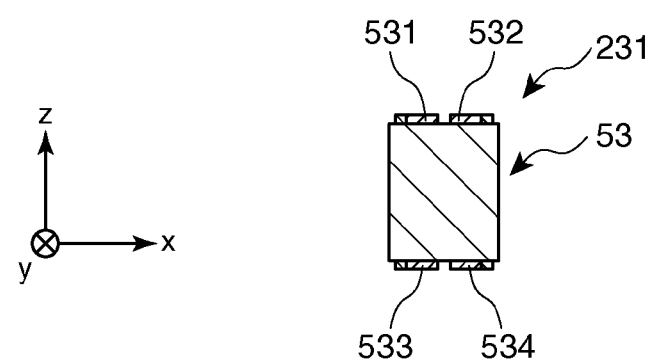
FIG. 5B is a cross-sectional view of the detection vibration arm shown in FIG. 5A.
Figure 6A:
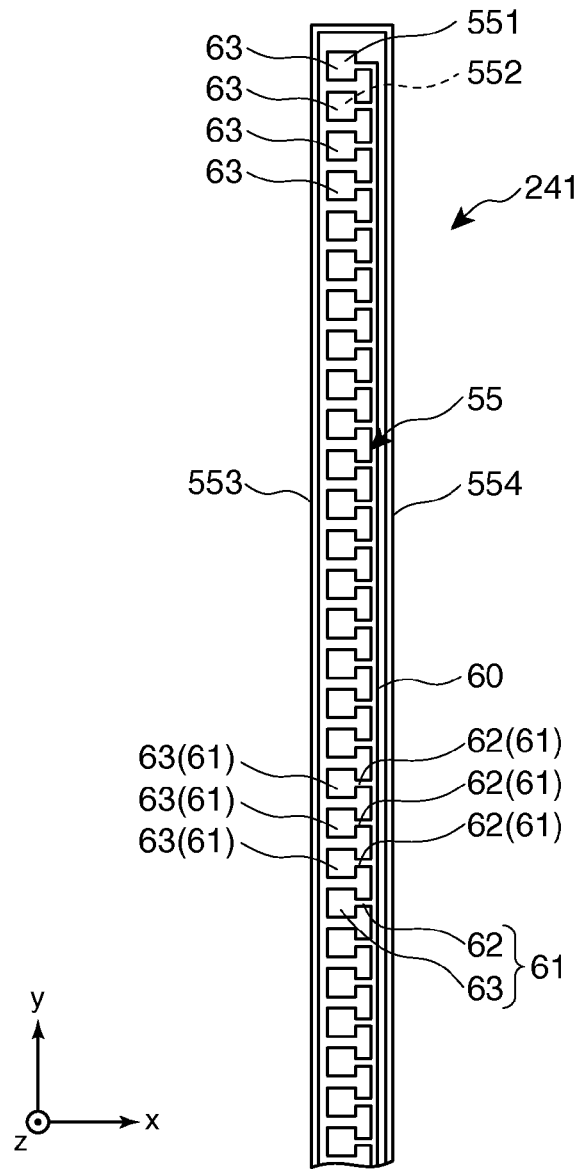
FIG. 6A is an enlarged plan view of an adjustment vibration arm of the sensor element shown in FIG. 3.
Figure 6B:
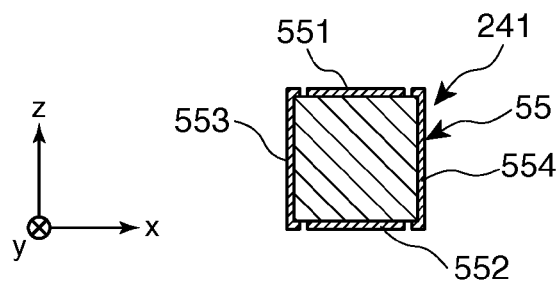
FIG. 6B is a cross-sectional view of the adjustment vibration arm shown in FIG. 6A.
Figure 7:
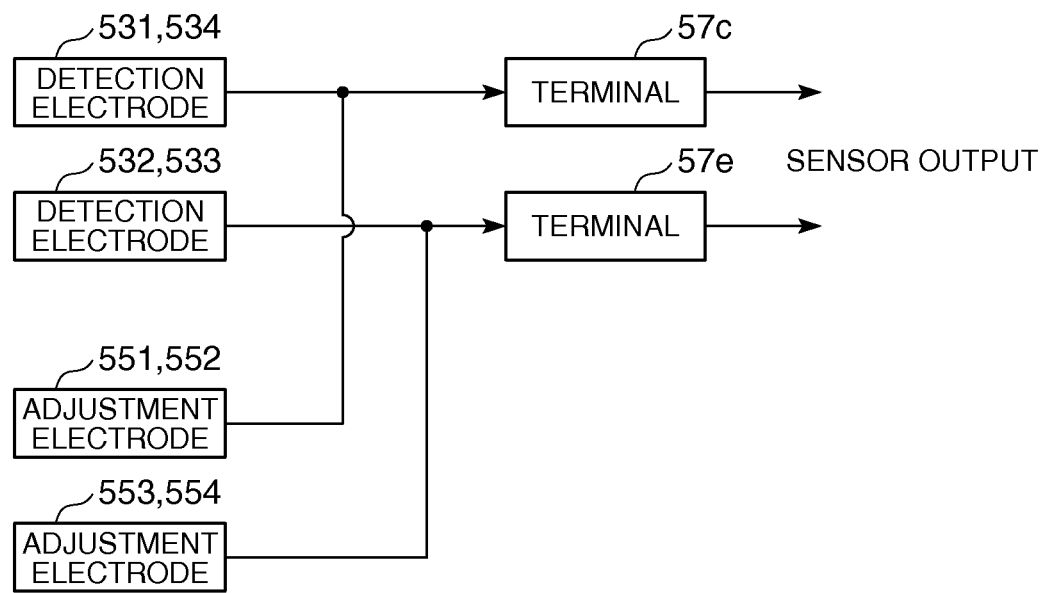
FIG. 7 is a diagram showing a connection state of detection electrodes and adjustment electrodes in the sensor element shown in FIG. 3.
Figure 8:
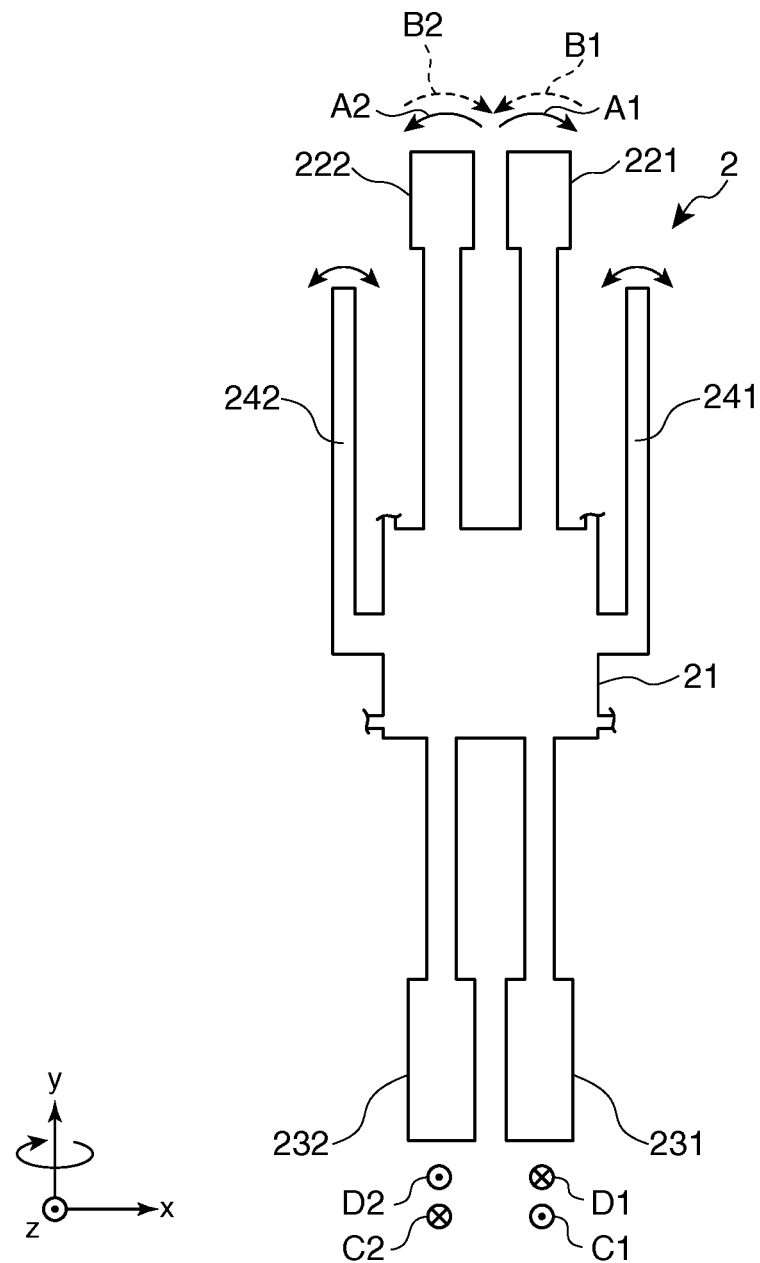
FIG. 8 is a diagram for describing the operation of the sensor element shown in FIG. 3.
Figure 9A:
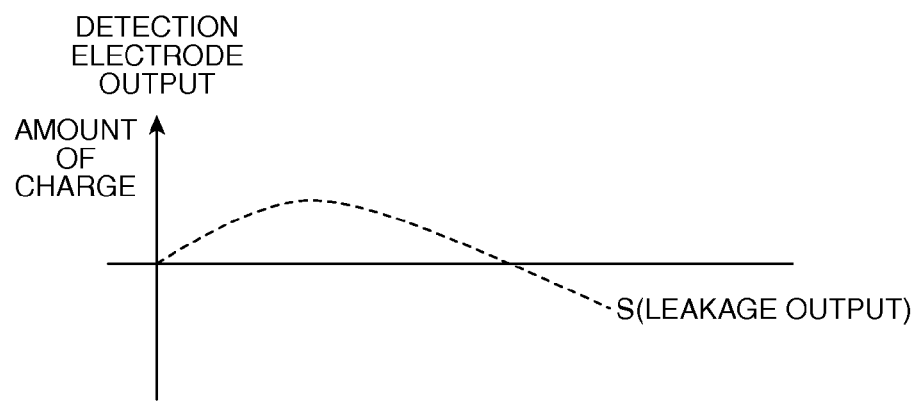
FIG. 9A is a graph showing leakage output of the detection electrode shown in FIG. 5.
Figure 9B:
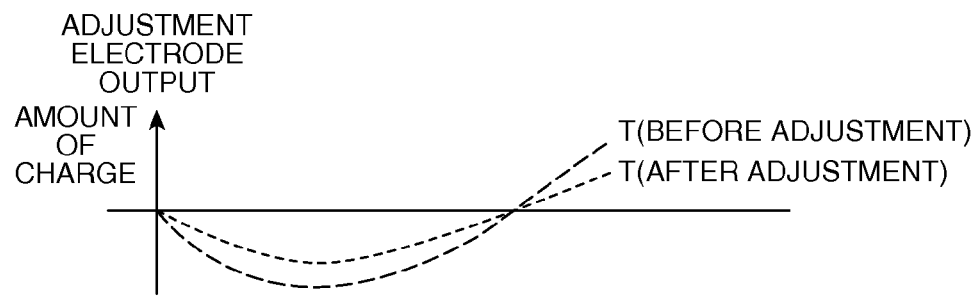
FIG. 9B is a graph showing output of the adjustment electrode shown in FIG. 6.

A first embodiment of the invention will be described. FIG. 1 is a schematic cross-sectional view briefly showing the composition of a sensor device (an electronic device) in accordance with the first embodiment of the invention. FIG. 2 is a plan view of the sensor device shown in FIG. 1. FIG. 3 is a plan view showing a sensor element provided in the sensor device shown in FIG. 1. FIG. 4A is an enlarged plan view of a drive vibration arm of the sensor element shown in FIG. 3, and FIG. 4B is a cross-sectional view of the drive vibration arm shown in FIG. 4A. FIG. 5A is an enlarged plan view of a detection vibration arm of the sensor element shown in FIG. 3, and FIG. 5B is a cross-sectional view of the detection vibration arm shown in FIG. 5A. FIG. 6A is an enlarged plan view of an adjustment vibration arm of the sensor element shown in FIG. 3, and FIG. 6B is a cross-sectional view of the adjustment vibration arm shown in FIG. 6A. FIG. 7 is a diagram showing a connection state of detection electrodes and adjustment electrodes in the sensor element shown in FIG. 3. FIG. 8 is a diagram for describing the operation of the sensor element shown in FIG. 3. FIG. 9A is a graph showing leakage output of the detection electrode shown in FIG. 5, and FIG. 9B is a graph showing output of the adjustment electrode shown in FIG. 6. For the sake of convenience of description, FIGS. 1-7 show x-axis, y-axis and z-axis, as mutually orthogonal three axes, the direction in parallel with the x-axis is defined as the "x-axis direction," the direction in parallel with the y-axis is defined as the "y-axis direction," and the direction in parallel with the z-axis is defined as the "z-axis direction." Also, the + side of the z-axis is defined as the "upper" side, and the − side of the z-axis is defined as the "lower" side.

Sensor Device

A sensor device 1 shown in FIG. 1 and FIG. 2 is a gyro sensor that detects an angular velocity. The sensor device 1 may be used for shake compensation for imaging devices, and position detection and position control in vehicles equipped with mobile navigation systems using GPS (Global Positioning System) satellite signals, and the like. The sensor device 1 has, as shown in FIG. 1 and FIG. 2, a sensor element 2, an IC chip 3, and a package 4 that houses the sensor element 2 and the IC chip 3. The components forming the sensor device 1 will be described below.

Sensor Element 2

The sensor element 2 is a gyro sensor element that detects an angular velocity about one axis. As shown in FIG. 3, the sensor element 2 has a base part 21, a pair of drive vibration arms 221 and 222, a pair of detection vibration arms 231 and 232, a pair of adjustment vibration arms (vibration arms) 241 and 242, a support part 25, four connection parts 261, 262, 263 and 264, drive electrode groups 51 and 52, detection electrode groups 53 and 54, and adjustment electrode groups 55 and 56.

In accordance with the present embodiment, the base part 21, the pair of drive vibration arms 221 and 222, the pair of detection vibration arms 231 and 232, the pair of adjustment vibration arms 241 and 242, the support part 25, and the four connection parts 261, 262, 263 and 264 are formed in one piece from piezoelectric material. As the piezoelectric material, any material may be used without any particular limitation, but quartz crystal may preferably be used. With the use of quartz crystal, the sensor element 2 can have excellent characteristic.

The quartz crystal has X-axis called "electrical axis," Y-axis called "mechanical axis," and Z-axis called "optical axis." The base part 21, the pair of drive vibration arms 221 and 222, the pair of detection vibration arms 231 and 232, the pair of adjustment vibration arms 241 and 242, the support part 25, and the four connection parts 261, 262, 263 and 264 may be formed by etching a substrate of quartz crystal having the Z-axis in the thickness direction and having a plane surface in parallel with the X-axis and the Y-axis. The thickness of the substrate is appropriately set according to an oscillation frequency (resonance frequency), outer size, workability, and the like of the sensor element 2. In an example to be described below, the base part 21, the pair of drive vibration arms 221 and 222, the pair of detection vibration arms 231 and 232, the pair of adjustment vibration arms 241 and 242, the support part 25, and the four connection parts 261, 262, 263 and 264 are formed in one piece from quartz crystal.

The base part 21 is supported on the support part 25 through the four connection parts 261, 262, 263 and 264. The four connection parts 261, 262, 263 and 264 each has an elongated shape, having one end connected to the base part 21, and another end connected to the support part 25. The drive vibration arms 221 and 222 each extend in the y-axis direction (+y direction) from the base part 21. Also, the drive vibration arms 221 and 222 each extend along the Y-axis of quartz crystal. Further, each of the drive vibration arms 221 and 222 has a cross section in a rectangular shape composed of a pair of sides in parallel with the x-axis and a pair of sides in parallel with the z-axis. Further, the drive electrode group 51 is provided on the drive vibration arm 221 and, similarly, the drive electrode group 52 is provided on the drive vibration arm 222.

Here, the drive electrode group 51 will be described as representative of the drive electrode groups. Note that the drive electrode group 52 is generally the same as the drive electrode group 51, and therefore its description will be omitted. The drive electrode group 51, as shown in FIGS. 4A and 4B, is formed from a drive electrode 511 provided on the top surface of the drive vibration arm 221, a drive electrode 512 provided on the lower surface of the drive vibration arm 221, a drive electrode 513 provided on one of the side surfaces (on the left side in FIG. 4B) of the drive vibration arm 221, and a drive electrode 514 provided on the other of the side surfaces (on the right side in FIG. 4B) of the drive vibration arm 221.

The drive electrode 511 and the drive electrode 512 are electrically connected to each other via wires (not shown) to have the same potential. Also, the drive electrode 513 and the drive electrode 514 are electrically connected to each other via wires (not shown) to have the same potential. The drive electrodes 511 and 512 are electrically connected to a terminal 57a provided on the support part 25 shown in FIG. 3 via wires (not shown). Also, the drive electrodes 513 and 514 are electrically connected to a terminal 57b provided on the support part 25 shown in FIG. 3 via wires (not shown).

The detection vibration arms 231 and 232 each extend in the y-axis direction (−y direction) from the base part 21. Also, the detection vibration arms 231 and 232 each extend along the Y-axis of quartz crystal. Further, the detection vibration arms 231 and 232 each have a cross section in a rectangular shape composed of a pair of sides in parallel with the x-axis and a pair of sides in parallel with the z-axis. These detection vibration arms 231 and 232 vibrate according to a physical quantity applied to the drive vibration arms 221 and 222, respectively.

Further, the detection electrode group 53 is provided on the detection vibration arm 231 and, similarly, the detection electrode group 54 is provided on the detection vibration arm 232. In this manner, the detection electrode groups 53 and 54 are provided on the detection vibration arms 231 and 232 that are provided independently of the drive vibration arms 221 and 222, such that the detection electrodes of the detection electrode groups 53 and 54 can each have a greater electrode area (the area of a portion that functions as an electrode). Therefore, the detection sensitivity of the sensor element 2 can be improved. Note that the detection vibration arm 231 and the detection electrode group 53 form a detection section. Similarly, the detection vibration arm 232 and the detection electrode group 54 form a detection section.

The detection electrode group 53 will be described below as representative of the detection electrode groups. Note that the detection electrode group 54 is generally the same as the detection electrode group 53, and therefore its description will be omitted. The detection electrode group 53, as shown in FIGS. 5A and 5B, is formed from detection electrodes 531 and 532 provided on the top surface of the detection vibration arm 231, and detection electrodes 533 and 534 provided on the lower surface of the detection vibration arm 231. Here, the detection electrodes 531 and 533 are provided on one side (on the left side in FIG. 5) in the width direction of the detection vibration arm 231, and the detection electrodes 532 and 534 are provided on the other side (on the right side in FIG. 5) in the width direction of the detection vibration arm 231.

The detection electrode 531 and the detection electrode 534 are electrically connected to each other via wires (not shown) to have the same potential. Also, the detection electrode 532 and the detection electrode 533 are electrically connected to each other via wires (not shown) to mutually have the same potential. Note that the detection electrodes 531 and 534 are paired with each other and the detection electrodes 532 and 533 are paired with each other.

The detection electrodes 531 and 534 are electrically connected to a terminal 57c provided on the support part 25 shown in FIG. 3 via wires (not shown). Also, the detection electrodes 532 and 533 are electrically connected to a terminal 57e provided on the support part 25 shown in FIG. 3 via wires (not shown). Note that the detection electrode group 54 is electrically connected to terminals 57d and 57f provided on the support part 25 shown in FIG. 3 via wires (not shown).

The adjustment vibration arms 241 and 242 each extend in the y-axis direction from the base part 21. Also, the adjustment vibration arms 241 and 242 each extend along the Y-axis of quartz crystal. Further, the adjustment vibration arms 241 and 242 each have a cross section in a rectangular shape that is composed of a pair of sides extending in parallel with the x-axis and a pair of sides extending in parallel with the z-axis. Each of the adjustment vibration arms 241 and 242 has a rectangular shape, having a front surface (a first surface), a back surface (a second surface), and a pair of side surfaces connecting the first surface and the second surface.

The adjustment vibration arms 241 and 242 are provided in parallel with the drive vibration arms 221 and 222 described above. In other words, the drive vibration arms 221 and 222 and the adjustment vibration arms 241 and 242 extend in parallel with one another. Accordingly, when the drive vibration arms 221 and 222 and the adjustment vibration arms 241 and 242 are composed of quartz crystal, the drive vibration arms 221 and 222 and the adjustment vibration arms 241 and 242 may be formed to extend in parallel with the Y-axis of quartz crystal, such that the drive vibration arms 221 and 222 can be effectively vibrated, and charges can be generated at the adjustment electrodes 551-554 (to be described below) with relatively simple structure. The adjustment electrode group 55 is provided on the adjustment vibration arm 241 and, similarly, the adjustment electrode group 56 is provided on the adjustment vibration arm 242.

The adjustment electrode group 55 will be described below as representative. Note that description of the adjustment electrode group 56 will be omitted as it is similar in configuration to the adjustment electrode group 55. The adjustment electrode group 55 is formed from, as shown in FIGS. 6A and 6B, an adjustment electrode 551 provided on the top surface of the adjustment vibration arm 241, an adjustment electrode 552 provided on the lower surface of the adjustment vibration arm 241, an adjustment electrode 553 provided on one of the side surfaces (on the left side in FIG. 6) of the adjustment vibration arm 241, and an adjustment electrode 554 provided on the other of the side surfaces (on the right side in FIG. 6) of the adjustment vibration arm 241.

The adjustment electrode 551 and the adjustment electrode 552 are formed in a manner to overlap each other as viewed in a plan view. In other words, the adjustment electrode 551 and the adjustment electrode 552 are formed such that their outer shapes coincide with each other as viewed in a plan view. By the adjustment electrode 551 and the adjustment electrode 552 thus formed, when branch parts 61 of the adjustment electrode 551 are cut, as described below, branch parts (not shown) of the adjustment electrode 552 corresponding to the cut branch parts 61 can be cut at the same time.

The adjustment electrode 551 and the adjustment electrode 552 are electrically connected to each other via wires (not shown) to have mutually the same potential. Also, the adjustment electrode 553 and the adjustment electrode 554 are electrically connected to each other to have mutually the same potential. Note that the adjustment electrodes 551 and 552 are paired with each other, and the adjustment electrodes 553 and 554 are paired with each other.

The adjustment electrodes 551 and 552 are electrically connected through wires (not shown), together with the detection electrodes 532 and 533 described above, to the terminal 57e provided on the support part 25 shown in FIG. 3. Also, the adjustment electrodes 553 and 554 are electrically connected through wires (not shown), together with the detection electrodes 531 and 534 described above, to the terminal 57c provided on the support part 25 shown in FIG. 3. Note that the adjustment electrode group 56 is electrically connected through wires (not shown), together with the detection electrode group 54, to the terminals 57d and 57f provided on the support part 25 shown in FIG. 3.

As shown in FIG. 7, the sensor element 2 having such adjustment electrodes 551-554 can output a value from the terminal 57c as a sensor output of which the amount of charge generated at the detection electrodes 531 and 534 and the amount of charge generated at the adjustment electrodes 551 and 552 are added together, and a value from the terminal 57e as a sensor output of which the amount of charge generated at the detection electrodes 532 and 533 and the amount of charge generated at the adjustment electrodes 553 and 554 are added together, respectively (which may simply be referred to as a "sensor output").

Charges generated at the adjustment electrodes 551 and 552 and at the adjustment electrodes 553 and 554 have reverse polarity with respect to charges generated at the detection electrodes 531 and 534 and the detection electrodes 532 and 533, such that at least a part of the charges generated at the detection electrodes 531 and 534 and the detection electrodes 532 and 533 is cancelled out. By removing a portion of the adjustment electrodes 551 and 552, the sensor output can be adjusted.

Next, the adjustment electrode 551 will be described below in detail. It is noted that description of the adjustment electrode 552 will be omitted as it is generally the same as the adjustment electrode 551. As shown in FIG. 6A, the adjustment electrode 551 is equipped with a common part 60 and a plurality of branch parts 61. The common part 60 is electrically connected to the detection electrodes 531 and 534 described above. Also, the plural branch parts 61 branch out from the common part 60 and are arranged side by side along the extension direction of the adjustment vibration arm 241.

Accordingly, at least one of the branch parts 61 among the plural branch parts 61 on the adjustment electrodes 551 and 552 or the common part 60 may be cut midway, whereby the charge between the adjustment electrodes 551 and 552 and the adjustment electrodes 553 and 554 can be reduced, and thus the sensor output can be adjusted. For example, the sensor output can be adjusted (corrected) such that the sensor output in the state in which no physical quantity is applied to the sensor element 2 (hereafter also referred to as a "zero point output") becomes zero.

In particular, the plurality of branch parts 61 branch out from the common part 60, such that, even when any arbitrary one of the branch parts 61 is cut, the remaining portion of the branch parts 61 can maintain their electrically connected state with the common part 60. In other words, the electrode area of the adjustment electrode 515 can be reduced by the amount of the arbitrary one of the branch parts 61 cut among the plural branch parts 61. Further, the plural branch parts 61 are arranged side by side along the extension direction of the adjustment vibration arm 241, such that the sensor output can be readily and highly accurately adjusted according to the position and the number of the branch parts 61 to be cut.

In accordance with the present embodiment, the common part 60 extends in the extension direction of the adjustment vibration arm 241, and the plural branch parts 61 branch out at mutually different multiple locations in the length direction of the common part 60. Accordingly, the structure of the adjustment electrodes 551 can be simplified. In the present embodiment, as shown in FIG. 6A, the common part 60 is eccentrically located to one side in the width direction of the adjustment vibration arm 241 as viewed in a plan view (as viewed in the z-axis direction). Also, the common part 60 is formed to have a narrow width, such that the common part 60 can be cut midway with relative ease.

Also, each of the plural branch parts 61 has a narrow part 62 having a narrow width formed on the side of the common part 60, and a wide part 63 having a greater width on the opposite side of the common part 60. As each of the plural branch parts 61 has the narrow part 62 and the wide part 63, the adjustment electrode 551 can secure a large electrode area before adjustment (before the common part 60 or the branch parts 61 are cut midway), a wider adjustment range can be secured for adjusting the sensor output through cutting the common part 60 or the branch parts 61 midway. Also, mid portions of the branch parts 61 can be cut with relative ease, as each of the branch parts 61 has the narrow part 62.

Also, the plural narrow parts 62 are provided in parallel with one another. Also, each of the plural narrow parts 62 extends in a direction orthogonal to the extension direction of the adjustment vibration arm 241, in other words, extends in the x-axis direction. Also, the plural branch parts 61 are formed to have mutually the same dimensions. Also, the plural branch parts 61 are arranged at equal pitches in the extension direction of the adjustment vibration arm 241, in other words, in the y-axis direction.

When a drive signal is applied between the terminal 57a and the terminal 57b in the sensor element 2 thus configured, as shown in FIG. 8, the drive vibration arm 221 and the drive vibration arm 222 flexurally vibrate (are driven to vibrate) in a manner to move closer to or separated from each other. More specifically, a state in which the drive vibration arm 221 flexes in a direction indicated by an arrow A1 shown in FIG. 8 and the drive vibration arm 222 flexes in a direction indicated by an arrow A2 shown in FIG. 8, and a state in which the drive vibration arm 221 flexes in a direction indicated by an arrow B1 shown in FIG. 8 and the drive vibration arm 222 flexes in a direction indicated by an arrow B2 shown in FIG. 8 are alternately repeated.

When an angular velocity ω about the y-axis is applied to the sensor element 2 in a state in which the drive vibration arms 221 and 222 are driven to vibrate, the drive vibration arms 221 and 222 flexurally vibrate in mutually opposite sides in the z-axis direction by Coriolis force. Due to this flexural vibration, the detection vibration arms 231 and 232 flexurally vibrate (detection-vibrate) in mutually opposite sides in the z-axis direction. More specifically, a state in which the detection vibration arm 231 flexes in a direction indicated by an arrow C1 shown in FIG. 8 and the detection vibration arm 232 flexes in a direction indicated by an arrow C2 shown in FIG. 8, and a state in which the detection vibration arm 231 flexes in a direction indicated by an arrow D1 shown in FIG. 8 and the detection vibration arm 232 flexes in a direction indicated by an arrow D2 shown in FIG. 8 are alternately repeated.

By detecting charges generated at the detection electrode groups 53 and 54 due to detection vibration of the detection vibration arms 231 and 232, the angular velocity ω worked on the sensor element 2 can be obtained. At this moment, the adjustment vibration arms 241 and 242 also flexurally vibrate, accompanying to the driving-vibration of the drive vibration arms 221 and 222, in mutually closing or separating directions.

In the sensor element 2, when the drive vibration arms 221 and 222 each do not have a cross-sectional shape as designed due to, for example, manufacturing variations, a charge that becomes a leakage output S is generated between the detection electrodes 531 and 534 and the detection electrodes 532 and 533, as shown in FIG. 9A, in the state in which the drive vibration arms 221 and 224 are vibrated by excitation without applying a physical quantity to the sensor element 2.

Also, in the sensor element 2, in the state in which the drive vibration arms 221 and 224 are vibrated by energization, regardless of whether or not a physical quantity is applied to the sensor element 2, a charge that becomes an adjustment output T is generated between the adjustment electrodes 551 and 552 and the adjustment electrodes 553 and 554. Because the leakage output S and the adjustment output T have mutually reversed polarities, the zero point output of the sensor element 2 can be adjusted to zero by setting an absolute value of the adjustment output T equal to an absolute value of the leakage output S.

Accordingly, by removing a portion of the adjustment electrodes 551 and 552, the amount of charge between the adjustment electrodes 551 and 552 and the adjustment electrodes 553 and 554 is reduced, whereby the sensor output is adjusted. In other words, the method for manufacturing the sensor element 2 includes a charge adjustment step of adjusting the amount of charge generated at the adjustment electrodes 551 and 552 by cutting the branch parts 61 or the common part 60 midway.

Figure 10:
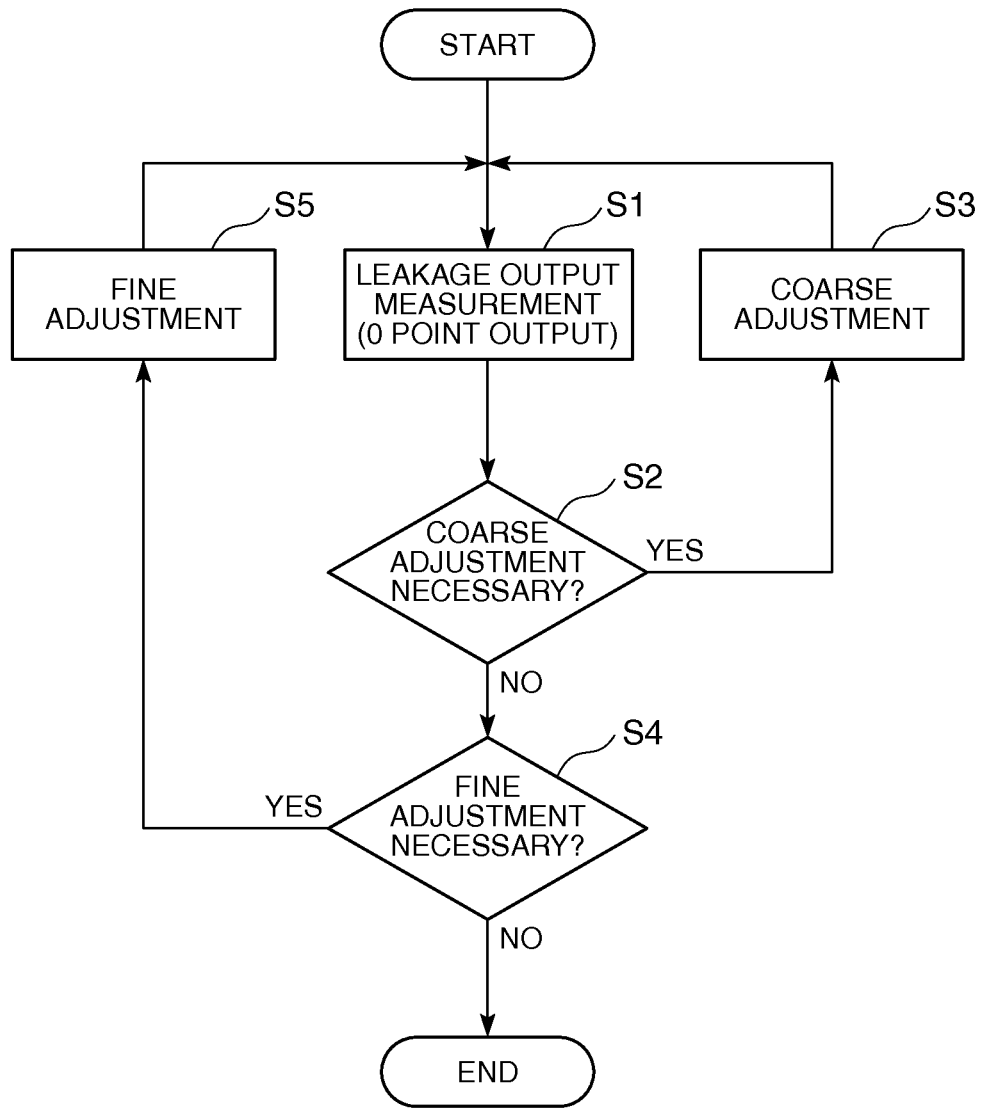
FIG. 10 is a flow chart showing an example of a characteristic adjustment method for the sensor element in accordance with an aspect of the invention.

Here, the charge adjustment step (a method for adjusting the characteristic of the sensor element 2) will be described with reference to a specific example. Note that, although the characteristic adjustment will be described below for the detection vibration arm 231 and the adjustment vibration arm 241 as representative, the characteristic adjustment is similarly conducted for the detection vibration arm 232 and the adjustment vibration arm 242. FIG. 10 is a flow chart showing an example of the method for adjusting the characteristic of a sensor element in accordance with an aspect of the invention, and FIG. 11 is a diagram for describing an example of the method for adjusting the characteristic of the sensor element in accordance with an aspect of the invention.

In the method for adjusting the characteristic of the sensor element 2, the sensor element 2 described above is prepared, and the characteristic of the sensor element 2 is adjusted by cutting at least one of the branch parts 61 midway among the plural branch parts 61 of the sensor element 2, or the common part 60 midway. According to the method for adjusting the characteristic of the sensor element 2, excellent detection sensitivity can be readily and securely exhibited.

For the characteristic adjustment, the amount of charge between the terminal 57c and the terminal 57e is measured, and the cutting is performed based on the measurement result. By the characteristic adjustment, excellent detection sensitivity can be readily and securely exhibited. More specifically, as shown in FIG. 10, first, a leakage output (a zero point output) is measured (step S1).

Figures 11A, 11B, 11C:
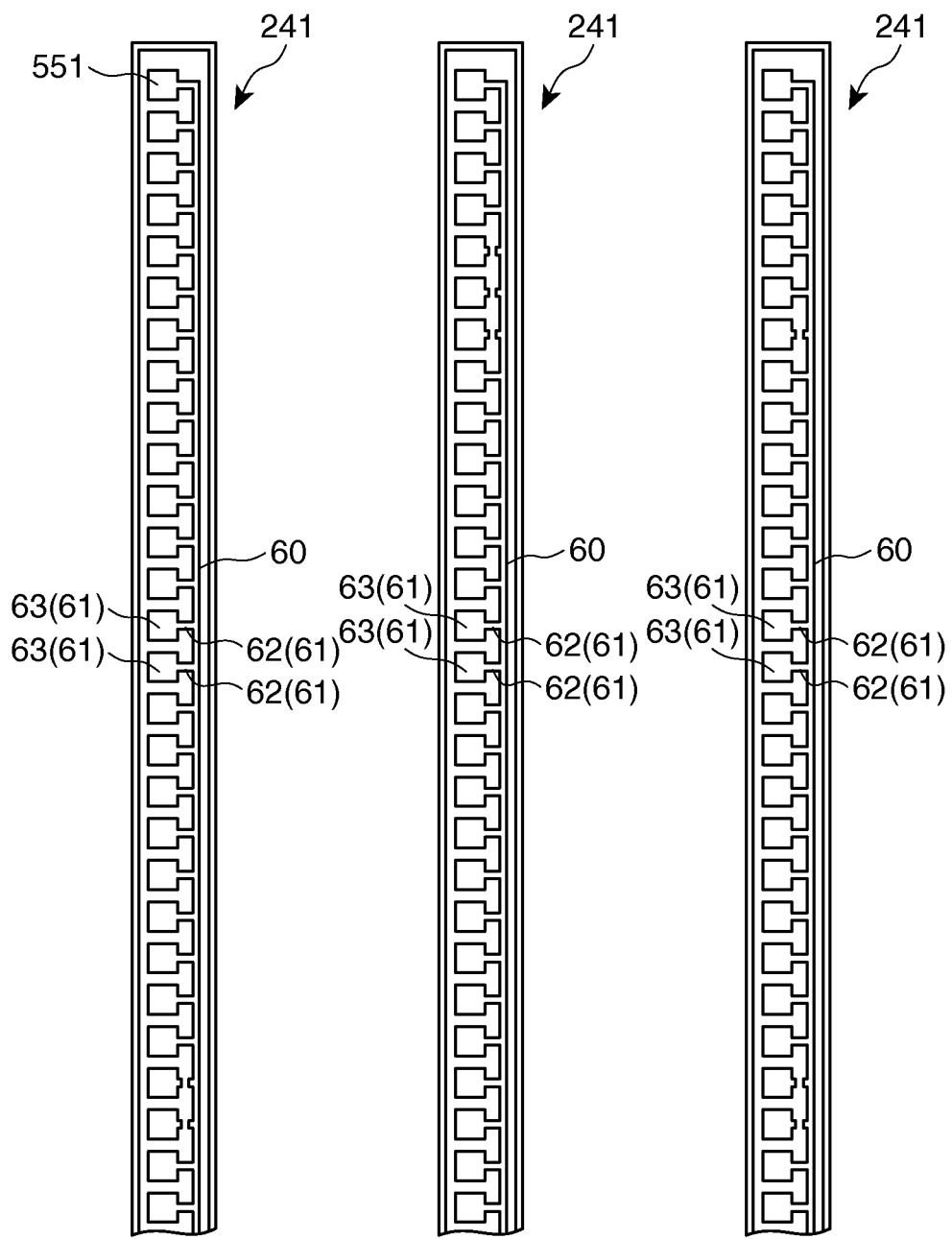
FIGS. 11A, 11B and 11C are illustrations for describing an example of the characteristic adjustment method for the sensor element in accordance with an aspect of the invention.

Based on the measurement result, whether coarse adjustment is necessary or not is judged (step S2). More specifically, when the zero point output is at a first set value or greater, it is judged that coarse adjustment is necessary, and when the zero point output is less than the first set value, it is judged that coarse adjustment is not necessary. When it is judged that coarse adjustment is necessary, coarse adjustment is performed (step S3). More specifically, for example, as shown in FIG. 11A, among the plural branch parts 61 of the adjustment electrode 551, a necessary number of the branch parts 61 located on the side of the base of the adjustment vibration arm 241 is cut.

Here, the amount of reduction in the adjustment output T resulting from cutting each of the branch parts 61 may be obtained in advance by experiment and/or calculation, whereby the number and the position of the branch parts 61 to be cut can be appropriately selected based on the zero point output measured in step S1. Also, the branch parts 61 may be cut by any appropriate method without any particular limitation, and may be cut by, for example, using a laser beam.

When it is judged that coarse adjustment is necessary, a part or the entirety of a mass adjustment film (not shown) provided on the end portion of the adjustment vibration arm 241 may be removed according to the necessity, thereby adjusting the resonance frequency of each of the adjustment vibration arms 241 and 243. More specifically, depending on the necessity, before conducting the charge adjustment step, the step of measuring charges generated at the detection electrodes 531-534 in the state in which the drive vibration arms 221 and 222 are vibrated by energization, and the step of adjusting the resonance frequency of the adjustment vibration arm 241 based on the measurement result may be conducted. Accordingly, the range of adjusting the sensor output can be made wider.

Removal of a portion or the entirety of the mass adjustment film may be conducted by an appropriate method without any particular limitation, and may be conducted by using, for example, a laser beam. After the coarse adjustment, the process returns to step S1 again to measure the leakage output (zero point output). Then, measurement of the zero point output and coarse adjustment are alternately repeated until the zero point output becomes less than the first set value.

On the other hand, when it is judged that coarse adjustment is not necessary, a judgment is made as to whether or not fine adjustment is necessary (step S4). More specifically, when the zero point output is at a second set value that is smaller than the first set value or greater, it is judged that fine adjustment is necessary, and when the zero point output is less than the second set value, it is judged that fine adjustment is not necessary.

When it is judged that fine adjustment is necessary, fine adjustment is conducted (step S5). More specifically, for example, as shown in FIG. 11B or FIG. 11C, among the plural branch parts 61 of the adjustment electrode 551, a necessary number of the branch parts 61 located on the side of the tip of the adjustment vibration arm 241 are cut. Note that FIG. 11B illustrates a case where fine adjustment is conducted without conducting coarse adjustment, and FIG. 11C illustrates a case where fine adjustment is conducted after conducting coarse adjustment. Also, FIGS. 11B and 11C illustrate a case where the narrow portions 62 of the branch parts 61 are cut. However, the common part 60 may be cut midway, whereby the electrode area of the adjustment electrode 551 can be reduced by a plurality of the branch portions together at once by one cutting operation.

Here, similar to the coarse adjustment, the amount of reduction in the adjustment output T resulting from cutting each of the branch parts 61 may be obtained in advance by experiment and/or calculation, whereby the number and the position of the branch parts 61 to be cut can be appropriately selected based on the zero point output measured in step S1. After the fine adjustment, the process returns to step S1 again, to measure the leakage output (zero point output). Then, measurement of the zero point output and fine adjustment are alternately repeated until the zero point output becomes less than the second set value. On the other hand, when it is judged that fine adjustment is not necessary, adjustment of the characteristic of the sensor element 2 is completed. According to the method of adjusting the characteristic of the sensor element 2 described above, the coarse adjustment and the fine adjustment described above can be arbitrarily selected and conducted according to the necessity, such that excellent detection sensitivity can be readily and securely exhibited.

IC Chip 3

An IC chip 3 shown in FIG. 1 and FIG. 2 is an electronic component having a function to drive the sensor element 2 described above, and a function to detect an output (a sensor output) from the sensor element 2. The IC chip 3 is equipped with, although not shown, a drive circuit that drives the sensor element 2, and a detection circuit that detects an output from the sensor element 2. Also, the IC chip 3 is provided with a plurality of connection terminals 31.

Package 4

A package 4, as shown in FIG. 1 and FIG. 2, includes a base member 41 (a base) having a recessed portion that opens upward, and a lid member 42 (a lid) that covers the recessed portion of the base member 41. By this structure, an inner space is formed between the base member 41 and the lid member 42 where the sensor element 2 and the IC chip 3 are housed.

The base member 41 is formed from a flat plate body 411 (a plate part), and a frame body 412 (a frame part) that is bonded to an upper surface of the plate body 411 at an outer peripheral portion thereof. The base member 41 may be composed of, for example, aluminum oxide sintered compact, quartz crystal, glass or the like. As shown in FIG. 1, the support part 25 of the sensor element 2 described above is bonded to the upper surface of the base member 41 (the surface on the side thereof covered by the lid member 42) by a bonding member 81 such as adhesive composed of, for example, epoxy resin, acrylic resin or the like. By this structure, the sensor element 2 is supported on and affixed to the base member 41.

The IC chip 3 described above is bonded to the upper surface of the base member 41 by a bonding member 82, such as, adhesive composed of, for example, epoxy resin, acrylic resin or the like. By this structure, the IC chip 3 is supported on and affixed to the base member 41. Furthermore, as shown in FIG. 1 and FIG. 2, a plurality of internal terminals 71 and a plurality of internal terminals 72 are provided on the upper surface of the base member 41.

The plural internal terminals 71 are electrically connected to the terminals 57a-57f of the sensor element 2 described above via wires comprised of, for example, bonding wires. The plural internal terminals 71 are electrically connected to the plural internal terminals 72 via wires (not shown). Also, the plural internal terminals 72 are electrically connected to the plural connecting terminals 31 of the IC chip 3 described above via wires comprised of, for example, bonding wires.

On the other hand, as shown in FIG. 1, the lower surface of the base member 41 (i.e., the bottom surface of the package 4) is provided with a plurality of external terminals 73 that are used when the package 4 is mounted on an apparatus (an external apparatus) in which the sensor device 1 is installed. The plural external terminals 73 are electrically connected to the internal terminals 72 described above via internal wires (not shown). Accordingly, the IC chip 3 and the plural external terminals 73 are electrically connected to one another.

The internal terminals 71 and 72 and the external terminals 73 are each comprised of, for example, a metalized layer of tungsten (W) or the like, and a metal membrane of laminated films of nickel (Ni), gold (Au) and the like that may be plated thereon. The lid member 42 is bonded air-tightly to the base member 41. Accordingly, the inner space of the package 4 is air-tightly sealed.

The lid member 42 may be formed from, for example, the same material as that of the base member 41, or made of metal, such as, Kovar, 42 Alloy, stainless steel or the like. The base member 41 and the lid member 42 may be bonded together by an appropriate method without any particular limitation, and may be bonded together by a bonding method using a brazing material, an adhesive composed of setting type resin or the like, or a welding method such as a seam welding, a laser welding or the like.

Such bonding may be conducted in a reduced pressure atmosphere or an inert gas atmosphere, such that the internal space of the package 4 can be maintained in a reduced pressure state or an inert gas-filled state. By the sensor element 2 installed in the sensor device 1 in accordance with the first embodiment described above, excellent detection sensitivity can be readily and securely exhibited. Also, the sensor device 1 equipped with the sensor element 2 described above can provide excellent detection sensitivity at low cost.

Second Embodiment

Figures 12A, 12B:
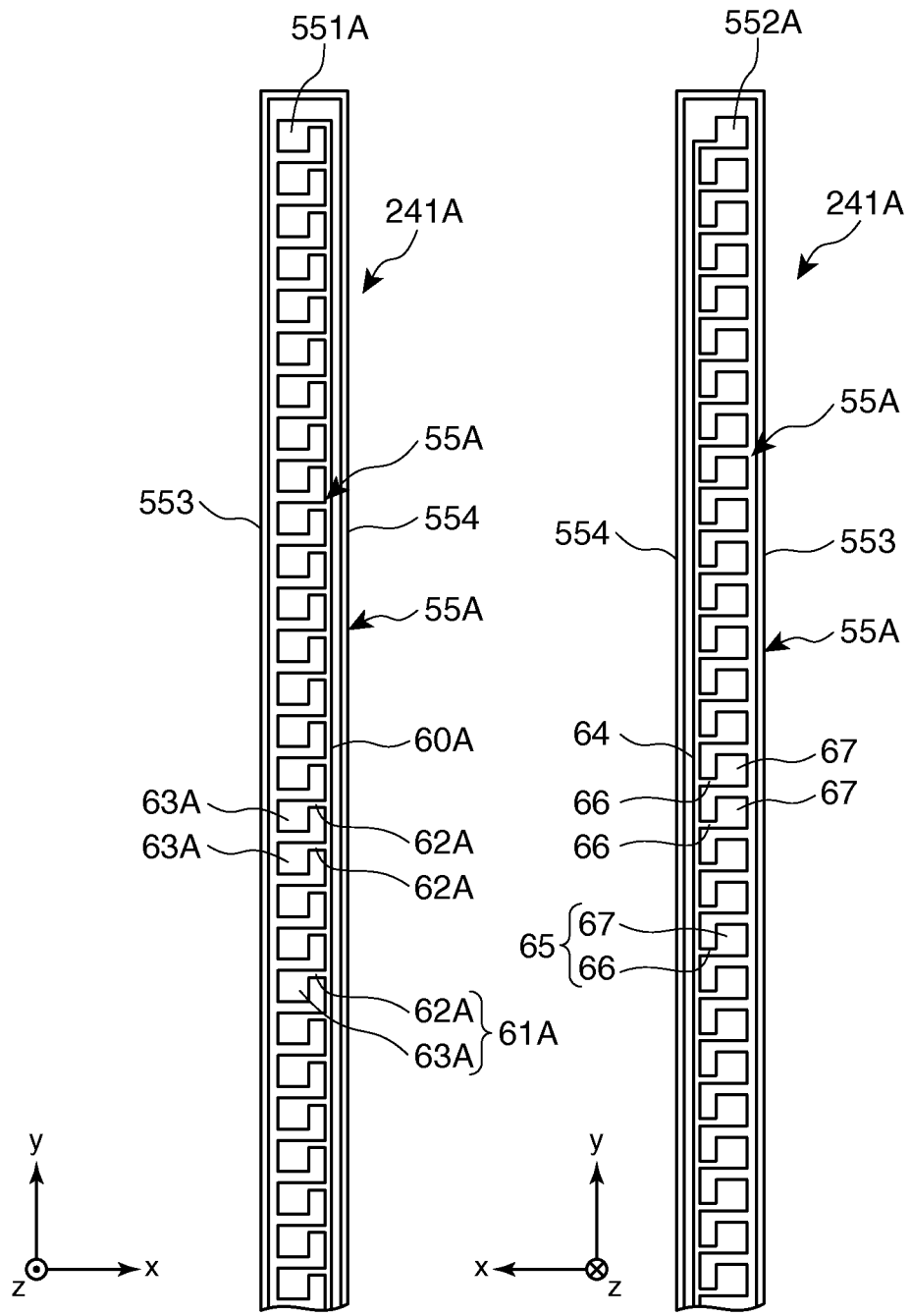
FIGS. 12A and 12B are enlarged plan views showing an adjustment vibration arm of a sensor element in accordance with a second embodiment of the invention.

Next, a second embodiment of the invention will be described. FIGS. 12A and 12B are enlarged plan views showing adjustment vibration arms of a sensor element in accordance with the second embodiment. The sensor element in accordance with the second embodiment is similar to the sensor element in accordance with the first embodiment described above, except that the adjustment electrode has a different shape.

Note that, in the following description of the sensor element of the second embodiment, aspects different from the embodiment described above will be mainly described and description of similar aspects will be omitted. Also, in FIGS. 12A and 12B, the same signs are assigned to the same configurations as those of the embodiment described above. The sensor element in accordance with the second embodiment has an adjustment vibration arm 241A, as shown in FIGS. 12A and 12B. Although not shown, similar to the first embodiment described above, the sensor element in accordance with the second embodiment includes a base part, a pair of drive vibration arms and a pair of detection vibration arms, and another adjustment vibration arm pairing with the adjustment vibration arm 241A also extends from the base part.

An adjustment electrode group 55A is provided on the adjustment vibration arm 241A. The adjustment electrode group 55A is formed from an adjustment electrode 551A provided on the upper surface (top surface) of the adjustment vibration arm 241A, an adjustment electrode 552A provided on the lower surface (back surface) of the adjustment vibration arm 241A, an adjustment electrode 553 provided on one of the side surfaces of the adjustment vibration arm 241A, and an adjustment electrode 554 provided on the other of the side surfaces of the adjustment vibration arm 241A.

The adjustment electrode 551A is equipped with a common part 60A and a plurality of branch parts 61A. Each of the branch parts 61A has a narrow part 62A formed in a narrow width on the side of the common part 60A, and a wide part 63A formed in a wider width on the opposite side of the common part 60A. Similarly, the adjustment electrode 552A is equipped with a common part 64 and a plurality of branch parts 65. Each of the branch parts 65 has a narrow part 66 formed in a narrow width on the side of the common part 64, and a wide part 67 formed in a wider width on the opposite side of the common part 64.

The adjustment electrodes 551A and 552A have portions in which the branch parts 61A and the branch parts 65 do not overlap one another as viewed in a plan view. Specifically, among the plural branch parts 61A provided on the top surface and the plural branch parts 65 provided on the back surface being mutually opposite each other through the center axis of the adjustment vibration arm 241A, the plural branch parts 61A provided on the top surface and the plural branch parts 65 provided on the back surface are provided not to overlap each other in at least a portion thereof, as viewed in a normal direction to the top surface or the back surface. More specifically, the narrow parts 62A and the narrow parts 66 are formed in a manner not to overlap each other, as viewed in a plan view. By this structure, although the adjustment electrode 551A and the adjustment electrode 552A face each other through the adjustment vibration arm 241A, the branch parts 61A of the adjustment electrode 551A, and the branch parts 65 of the adjustment electrode 552A can be cut independently from one another by using a laser beam. Accordingly, the sensor output can be adjusted with higher accuracy. By the sensor element in accordance with the second embodiment described above, excellent detection sensitivity can also be readily and securely exhibited.

Third Embodiment

Figure 13:
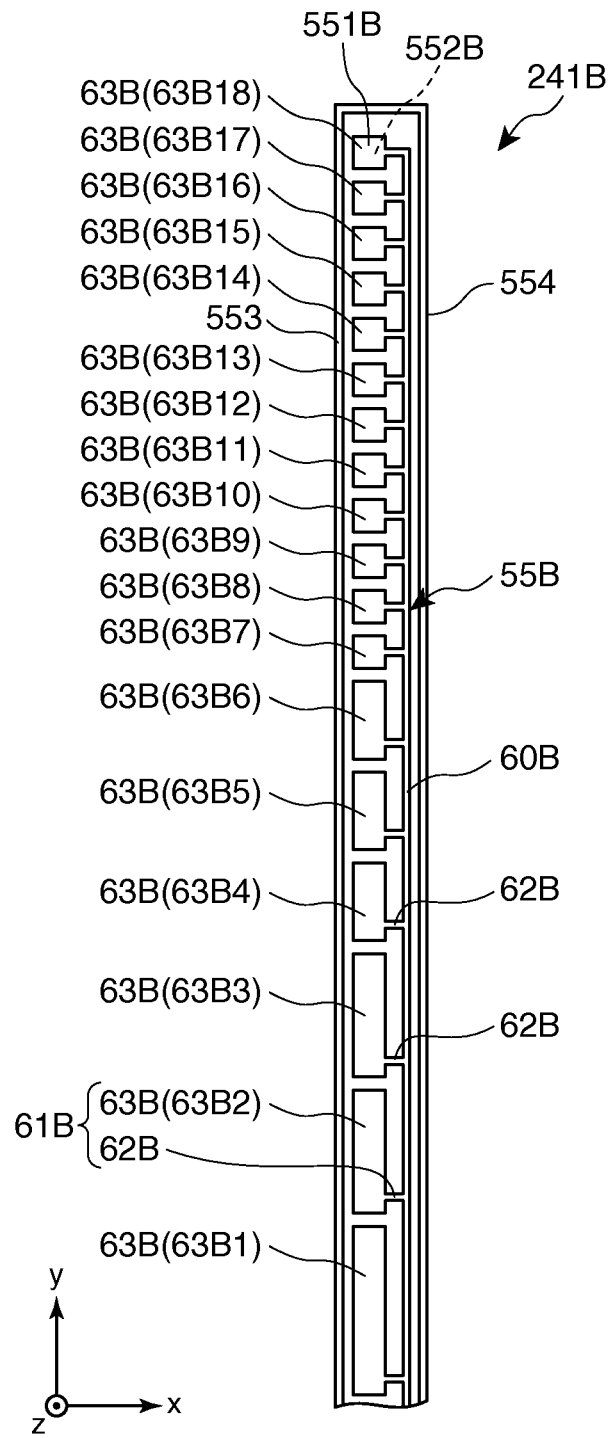
FIG. 13 is an enlarged plan view showing an adjustment vibration arm of a sensor element in accordance with a third embodiment of the invention.

Next, a third embodiment of the invention will be described. FIG. 13 is an enlarged plan view showing an adjustment vibration arm of a sensor element in accordance with the third embodiment. The sensor element in accordance with the third embodiment is similar to the sensor element in accordance with the first embodiment described above, except that the adjustment electrode has a different shape.

Note that, in the following description of the sensor element of the third embodiment, aspects different from the embodiments described above will be mainly described and description of similar aspects will be omitted. Also, in FIG. 13, the same signs are assigned to the same configurations as those of the embodiments described above. The sensor element in accordance with the third embodiment has an adjustment vibration arm 241B as shown in FIG. 13. Although not shown, similar to the first embodiment described above, the sensor element in accordance with the third embodiment includes a base part, a pair of drive vibration arms and a pair of detection vibration arms, and another adjustment vibration arm paring with the adjustment vibration arm 241B also extends from the base part.

An adjustment electrode group 55B is provided on the adjustment vibration arm 241B. The adjustment electrode group 55B is formed from an adjustment electrode 551B provided on the upper surface of the adjustment vibration arm 241B, an adjustment electrode 552B provided on the lower surface of the adjustment vibration arm 241B, an adjustment electrode 553 provided on one of the side surfaces of the adjustment vibration arm 241B, and an adjustment electrode 554 provided on the other of the side surfaces of the adjustment vibration arm 241B.

The adjustment electrode 551B will be described below in detail. Note that the adjustment electrode 552B is similar to the adjustment electrode 551B. The adjustment electrode 551B is equipped with a common part 60B and a plurality of branch parts 61B. Each of the branch parts 61B has a narrow part 62B formed in a narrow width on the side of the common part 60B, and a wide part 63B formed in a wider width on the opposite side of the common part 60B.

The plural wide parts 63B include wide parts 63B1-63B6 provided on the side of the base end of the adjustment vibration arm 241B, and a plurality of wide parts 63B7-63B18 provided on the side of the tip end of the adjustment vibration arm 241B. The wide parts 63B1-63B18 are arranged from the base end side to the tip end side of the adjustment vibration arm 241B in the order of the wide part 63B1, the wide part 63B2, the wide part 63B3, the wide part 63B4, the wide part 63B5, the wide part 63B6, . . . , and the wide part 63B18.

The width of each of the wide parts 63B1-63B6 is greater than the width of each of the wide parts 63B7-63B18 in the y-axis direction. Accordingly, the area (electrode area) in a plan view of each of the wide parts 63B1-63B6 is greater than the area (electrode area) of each of the wide parts 63B7-63B18 as viewed in a plan view. Therefore, the amount of reduction in the adjustment output (in other words, the amount of adjustment in coarse adjustment) by cutting the branch part 61B having each of the wide parts 63B1-63B6 can be made greater. Also, the amount of reduction in the adjustment output (in other words, the amount of adjustment in fine adjustment) by cutting the branch part 61B having each of the wide parts 63B7-63B18 can be made smaller. By the sensor element in accordance with the third embodiment described above, excellent detection sensitivity can also be readily and securely exhibited.

Fourth Embodiment

Figure 14:
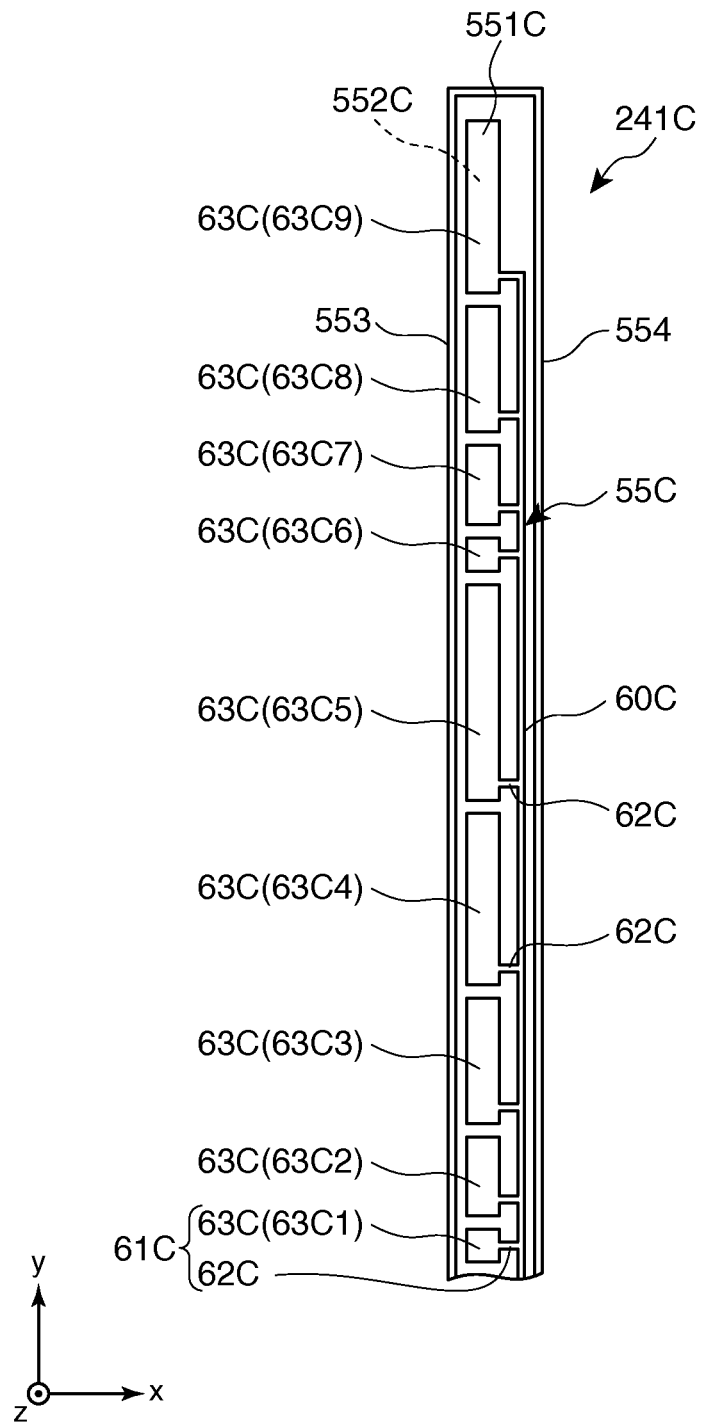
FIG. 14 is an enlarged plan view showing an adjustment vibration arm of a sensor element in accordance with a fourth embodiment of the invention.

Next, a fourth embodiment of the invention will be described. FIG. 14 is an enlarged plan view showing an adjustment vibration arm of a sensor element in accordance with the fourth embodiment. The sensor element in accordance with the fourth embodiment is similar to the sensor element in accordance with the first embodiment described above, except that the adjustment electrode has a different shape.

Note that, in the following description of the sensor element of the fourth embodiment, aspects different from the embodiments described above will be mainly described, and description of similar aspects will be omitted. Also, in FIG. 14, the same signs are assigned to the same configurations as those of the embodiments described above.

The sensor element in accordance with the fourth embodiment has an adjustment vibration arm 241C as shown in FIG. 14. Although not shown, similar to the first embodiment described above, the sensor element in accordance with the fourth embodiment includes a base part, a pair of drive vibration arms and a pair of detection vibration arms, and another adjustment vibration arm paring with the adjustment vibration arm 241C also extends from the base part.

An adjustment electrode group 55C is provided on the adjustment vibration arm 241C. The adjustment electrode group 55C is formed from an adjustment electrode 551C provided on the upper surface of the adjustment vibration arm 241C, an adjustment electrode 552C provided on the lower surface of the adjustment vibration arm 241C, an adjustment electrode 553 provided on one of the side surfaces of the adjustment vibration arm 241C, and an adjustment electrode 554 provided on the other of the side surfaces of the adjustment vibration arm 241C.

The adjustment electrode 551C will be described below in detail. Note that the adjustment electrode 552C is similar to the adjustment electrode 551C. The adjustment electrode 551C is equipped with a common part 60C and a plurality of branch parts 61C. Each of the branch parts 61C has a narrow part 62C formed in a narrow width on the side of the common part 60C, and a wide part 63C formed in a wider width on the opposite side of the common part 60C.

The plural wide parts 63C include wide parts 63C1-63C5 provided on the side of the base end of the adjustment vibration arm 241C, and a plurality of wide parts 63C6-63C9 provided on the side of the tip end of the adjustment vibration arm 241C. In the wide parts 63C1-63C5, among two adjacent ones of the wide parts 63C, one of the wide parts 63C on the tip end side of the adjustment vibration arm 241C in the y-axis direction is greater in width than the other wide part 63C on the base end side in the y-axis direction. Therefore, the amount of reduction in the adjustment output (in other words, the amount of adjustment in coarse adjustment) by cutting the branch part 61C having each of the wide parts 63C1-63C5 can be made equal to each other, or mutual differences in the amount of reduction can be made smaller. As a result, coarse adjustment can be conducted with ease.

Similarly, in the wide parts 63C6-63C9, among two adjacent ones of the wide parts 63C, one of the wide parts 63C on the tip end side of the adjustment vibration arm 241 in the y-axis direction is greater in width than the other wide part 63C on the base end side in the y-axis direction. By this structure, the amount of reduction in the adjustment output (in other words, the amount of adjustment in fine adjustment) by cutting the branch part 61C having each of the wide parts 63C6-63C9 can be made equal to each other, or mutual differences in the amount of reduction can be made smaller. As a result, fine adjustment can be readily conducted. By the sensor element in accordance with the fourth embodiment described above, excellent detection sensitivity can also be readily and securely exhibited.

Fifth Embodiment

Figure 15:
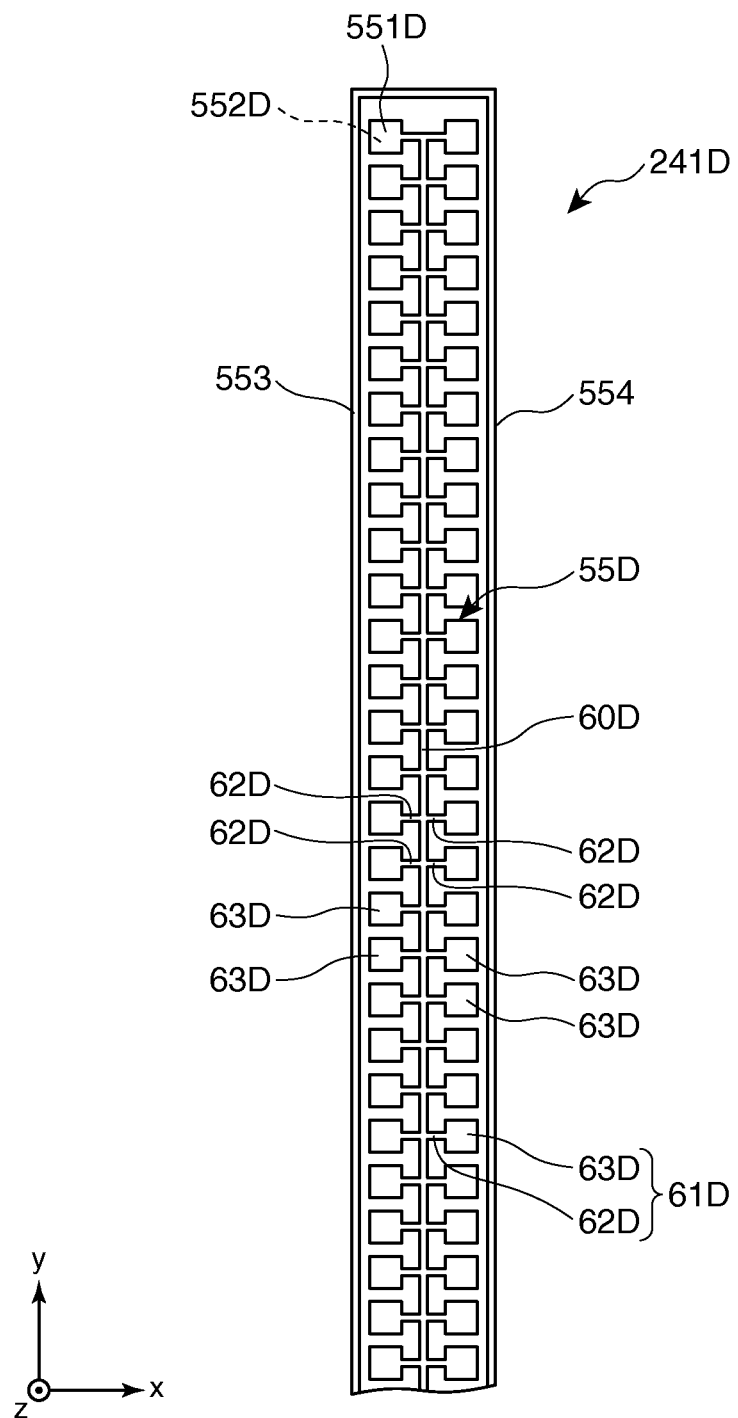
FIG. 15 is an enlarged plan view showing an adjustment vibration arm of a sensor element in accordance with a fifth embodiment of the invention.

Next, a fifth embodiment of the invention will be described. FIG. 15 is an enlarged plan view showing an adjustment vibration arm of a sensor element in accordance with the fifth embodiment. The sensor element in accordance with the fifth embodiment is similar to the sensor element in accordance with the first embodiment described above, except that the adjustment electrode has a different shape.

Note that, in the following description of the sensor element of the fifth embodiment, aspects different from the embodiments described above will be mainly described and description of similar aspects will be omitted. Also, in FIG. 15, the same signs are assigned to the same configurations as those of the embodiments described above. The sensor element in accordance with the fifth embodiment has an adjustment vibration arm 241D as shown in FIG. 15. Although not shown, similar to the first embodiment described above, the sensor element in accordance with the fifth embodiment includes a base part, a pair of drive vibration arms and a pair of detection vibration arms, and another adjustment vibration arm paring with the adjustment vibration arm 241D also extends from the base part.

An adjustment electrode group 55D is provided on the adjustment vibration arm 241D. The adjustment electrode group 55D is formed from an adjustment electrode 551D provided on the upper surface of the adjustment vibration arm 241D, an adjustment electrode 552D provided on the lower surface of the adjustment vibration arm 241D, an adjustment electrode 553 provided on one of the side surfaces of the adjustment vibration arm 241D, and an adjustment electrode 554 provided on the other of the side surfaces of the adjustment vibration arm 241D.

The adjustment electrode 551D will be described below in detail. Note that the adjustment electrode 552D is similar to the adjustment electrode 551D. The adjustment electrode 551D is equipped with a common part 60D and a plurality of branch parts 61D. The common part 60D is provided in a center section in the width direction of the adjustment vibration arm 241D as viewed in a plan view.

Each of the branch parts 61D has a narrow part 62D formed in a narrow width on the side of the common part 60D, and a wide part 63D formed in a wider width on the opposite side of the common part 60D. The branch parts 61D are provided on one side and the other side in the width direction of the common part 60D. By this structure, the common part 60D can be prevented or suppressed from functioning as the adjustment electrode 551D. Accordingly, adjustment of the sensor output can be readily performed. Also, the adjustment electrode 551D before adjustment (before the common part or the branch parts are cut midway) can secure a large electrode area. By the sensor element in accordance with the fifth embodiment described above, excellent detection sensitivity can also be readily and securely exhibited.

Sixth Embodiment

Figure 16A:
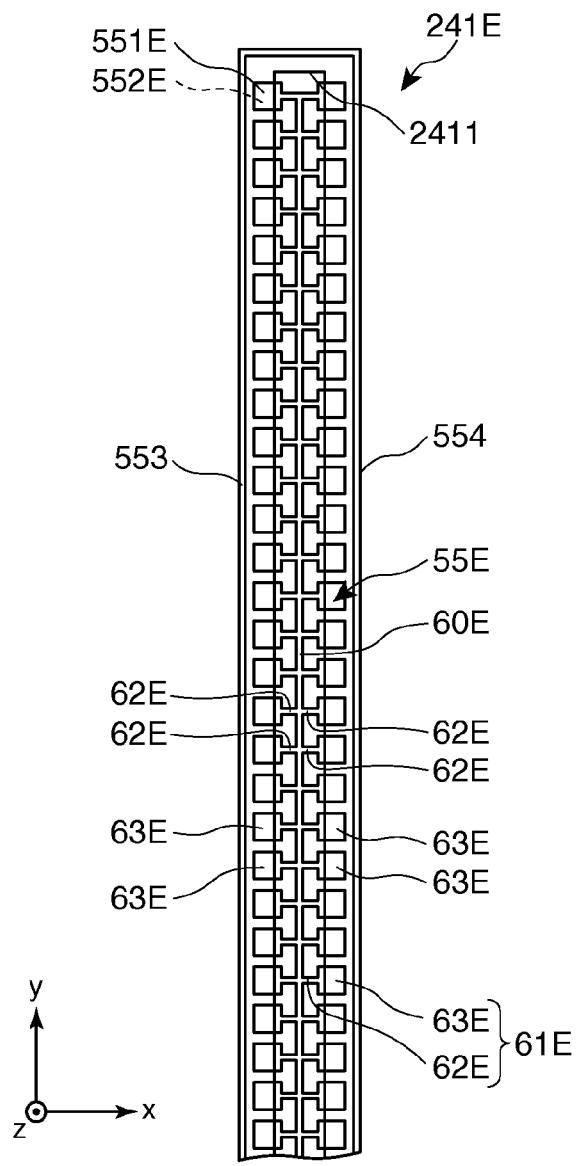
FIG. 16A is an enlarged plan view showing an adjustment vibration arm of a sensor element in accordance with a sixth embodiment of the invention.

Next, a sixth embodiment of the invention will be described. FIG. 16A is an enlarged plan view showing an adjustment vibration arm of a sensor element in accordance with the sixth embodiment. The sensor element in accordance with the sixth embodiment is similar to the sensor element in accordance with the first embodiment described above, except that the adjustment electrode has a different shape. Further, the sensor element in accordance with the sixth embodiment is similar to the sensor element in accordance with the fifth embodiment described above, except that the adjustment vibration arm has a different transverse cross-sectional shape.

Note that, in the following description of the sensor element of the sixth embodiment, aspects different from the embodiments described above will be mainly described and description of similar aspects will be omitted. Also, in FIGS. 16A and 16B, the same signs are assigned to the same configurations as those of the embodiments described above.

Figure 16B:
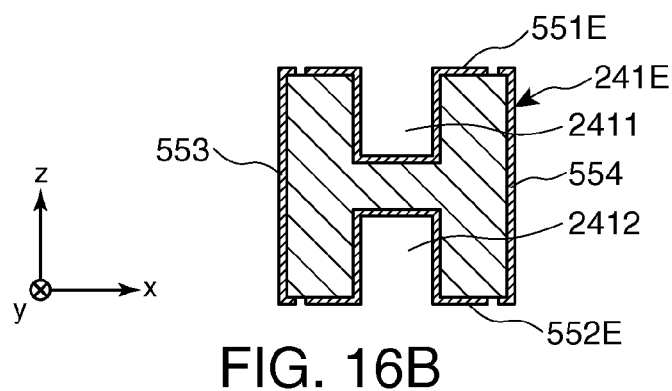
FIG. 16B is a cross-sectional view of the adjustment vibration arm shown in FIG. 16A.

The sensor element in accordance with the sixth embodiment has an adjustment vibration arm 241E as shown in FIGS. 16A and 16B. Although not shown, similar to the first embodiment described above, the sensor element in accordance with the sixth embodiment includes a base part, a pair of drive vibration arms and a pair of detection vibration arms, and another adjustment vibration arm paring with the adjustment vibration arm 241E also extends from the base part.

The adjustment vibration arm 241E has an H-letter shaped cross section. In a center section in the width direction of the upper surface of the adjustment vibration arm 241E, a groove part 2411 is formed along the y-axis direction. Similarly, in a center section in the width direction of the lower surface of the adjustment vibration arm 241E, a groove part 2412 is formed along the y-axis direction. Each of the groove parts 2411 and 2412 has a rectangular cross-sectional shape, and has wall surfaces extending in parallel with the side surfaces of the adjustment vibration arm 241E.

An adjustment electrode group 55E is provided on the adjustment vibration arm 241E. The adjustment electrode group 55E is formed from an adjustment electrode 551E provided on the upper surface of the adjustment vibration arm 241E, an adjustment electrode 552E provided on the lower surface of the adjustment vibration arm 241E, an adjustment electrode 553 provided on one of the side surfaces of the adjustment vibration arm 241E, and an adjustment electrode 554 provided on the other of the side surfaces of the adjustment vibration arm 241E.

The adjustment electrode 551E will be described below in detail. Note that the adjustment electrode 552E is similar to the adjustment electrode 551E. The adjustment electrode 551E is equipped with a common part 60E and a plurality of branch parts 61E. The common part 60E is provided in a center section in the width direction of the adjustment vibration arm 241E as viewed in a plan view.

Each of the branch parts 61E has a narrow part 62E formed in a narrow width on the side of the common part 60E, and a wide part 63E formed in a wider width on the opposite side of the common part 60E. The branch parts 61E are provided on one side and the other side in the width direction of the common part 60E. In particular, a portion of each of the branch parts 61E is provided on the wall surface of the groove part 2411 (the wall surface extending in parallel with the side surface of the adjustment vibration arm 241E). By such a structure, the charge to be outputted from the adjustment electrode 551E can be made greater. For this reason, the range of adjusting the sensor output can be made wider. By the sensor element in accordance with the sixth embodiment described above, excellent detection sensitivity can also be readily and securely exhibited.

Seventh Embodiment

Figure 17:
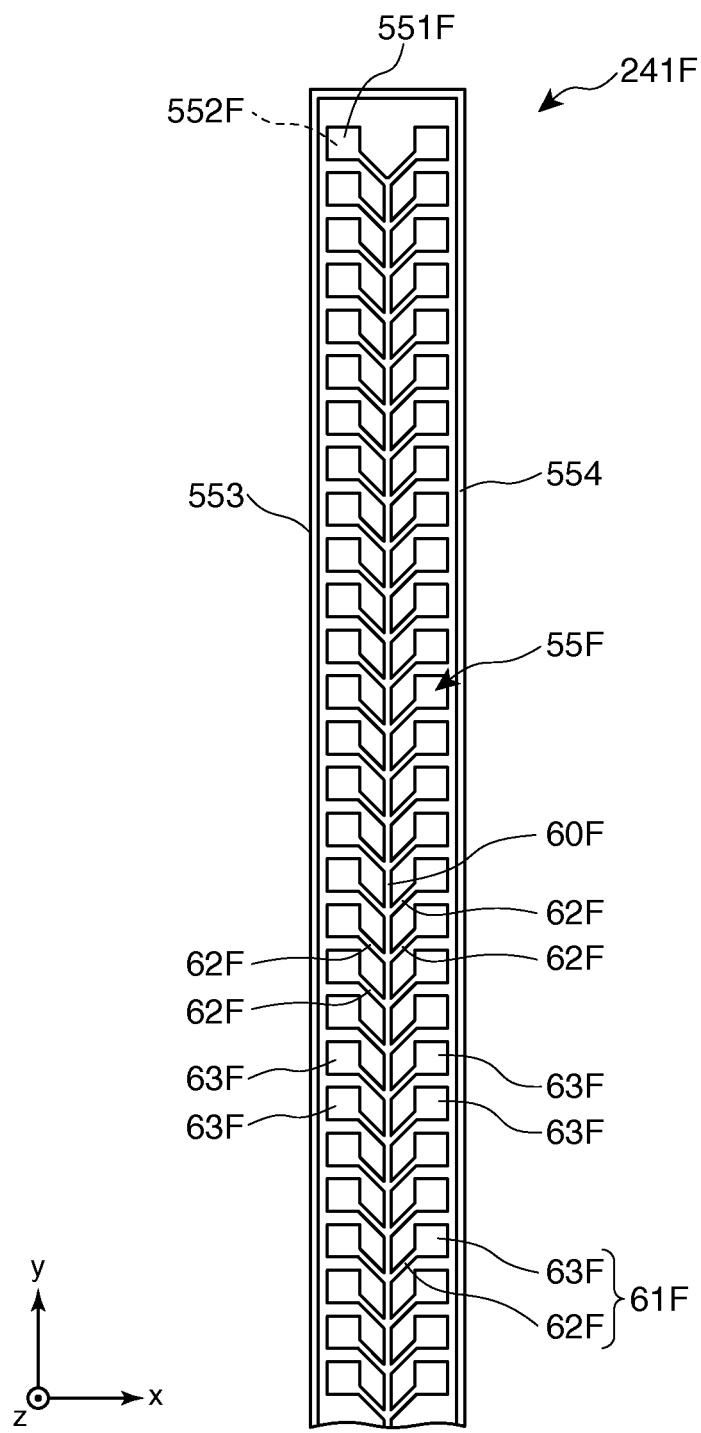
FIG. 17 is an enlarged plan view showing an adjustment vibration arm of a sensor element in accordance with a seventh embodiment of the invention.

Next, a seventh embodiment of the invention will be described. FIG. 17 is an enlarged plan view showing an adjustment vibration arm of a sensor element in accordance with the seventh embodiment. The sensor element in accordance with the seventh embodiment is similar to the sensor element in accordance with the first embodiment described above, except that the adjustment electrode has a different shape. Also, the sensor element in accordance with the seventh embodiment is similar to the sensor element in accordance with the fifth embodiment described above, except that the narrow parts of the adjustment electrode have different orientations.

Note that, in the following description of the sensor element of the seventh embodiment, aspects different from the embodiments described above will be mainly described and description of similar aspects will be omitted. Also, in FIG. 17, the same signs are assigned to the same configurations as those of the embodiments described above.

The sensor element in accordance with the seventh embodiment has an adjustment vibration arm 241F as shown in FIG. 17. Although not shown, similar to the first embodiment described above, the sensor element in accordance with the seventh embodiment includes a base part, a pair of drive vibration arms and a pair of detection vibration arms, and another adjustment vibration arm paring with the adjustment vibration arm 241F also extends from the base part.

An adjustment electrode group 55F is provided on the adjustment vibration arm 241F. The adjustment electrode group 55F is formed from an adjustment electrode 551F provided on the upper surface of the adjustment vibration arm 241F, an adjustment electrode 552F provided on the lower surface of the adjustment vibration arm 241F, an adjustment electrode 553 provided on one of the side surfaces of the adjustment vibration arm 241F, and an adjustment electrode 554 provided on the other of the side surfaces of the adjustment vibration arm 241F.

The adjustment electrode 551F will be described below in detail. Note that the adjustment electrode 552F is similar to the adjustment electrode 551F. The adjustment electrode 551F is equipped with a common part 60F and a plurality of branch parts 61F. The common part 60F is provided in a center section in the width direction of the adjustment vibration arm 241F as viewed in a plan view.

Each of the branch parts 61F has a narrow part 62F formed in a narrow width on the side of the common part 60F, and a wide part 63F formed in a wider width on the opposite side of the common part 60F. In particular, each of the narrow parts 63F extends in a direction inclined with respect to the extension direction of the adjustment vibration arm 241F. By such a structure, at the time of cutting the narrow parts 62F by a laser beam, the narrow parts 62F can be cut by scanning the laser beam in either the x-axis direction or the y-axis direction. Accordingly, the branch parts 61F can be readily cut midway. The branch parts 61F are provided on one side and the other side in the width direction of the common part 60F, respectively. By the sensor element in accordance with the seventh embodiment described above, excellent detection sensitivity can also be readily and securely exhibited.

The sensor device in accordance with any one of the embodiments described above can be implemented and used in various types of electronic apparatuses. Such electronic apparatuses can exhibit excellent reliability.

Electronic Apparatus

Here, examples of an electronic apparatus equipped with an electronic device in accordance with an embodiment of the invention will be described in detail with reference to FIGS. 18-20.

Figure 18:
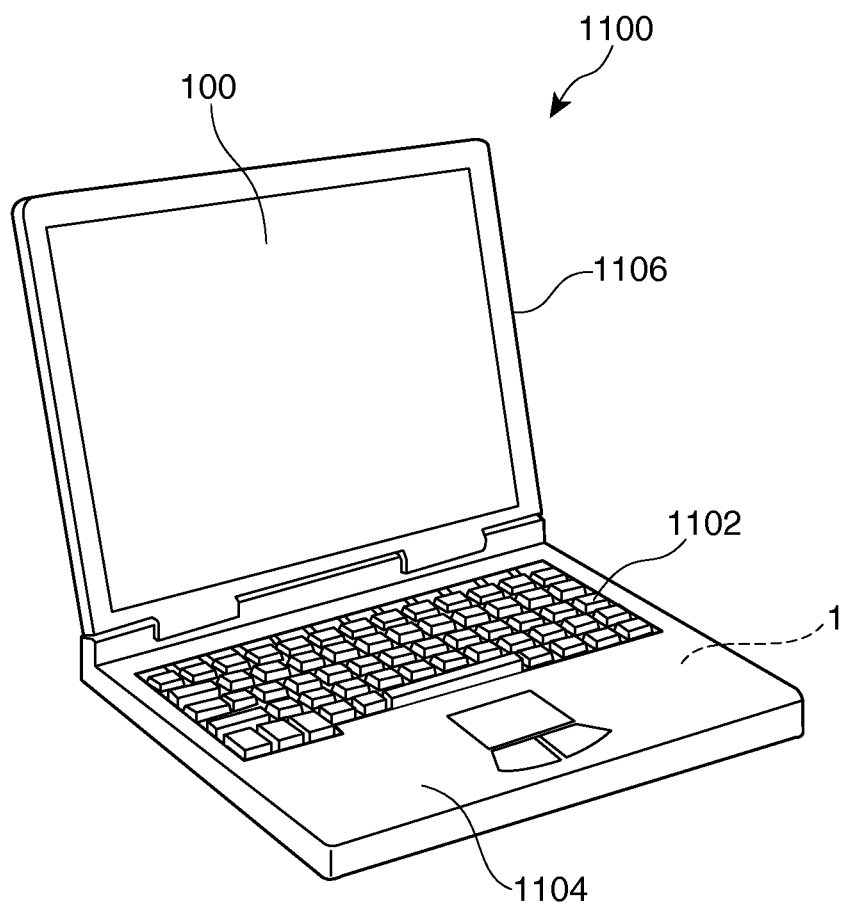
FIG. 18 is a perspective view showing the configuration of a mobile (notebook type) personal computer using an electronic apparatus in accordance with an aspect of the invention.

FIG. 18 is a perspective view showing the configuration of a mobile (or a notebook) personal computer 1100 in which an electronic apparatus in accordance with an embodiment of the invention is implemented. As shown in FIG. 18, the personal computer 1100 is configured with a main body 1104 equipped with a keyboard 1102, and a display unit 1106 equipped with a display section 100. The display unit 1106 is rotatably supported on the main body 1104 through a hinge structure. The sensor device 1 described above that functions as a gyro sensor is built in the personal computer 1100.

Figure 19:
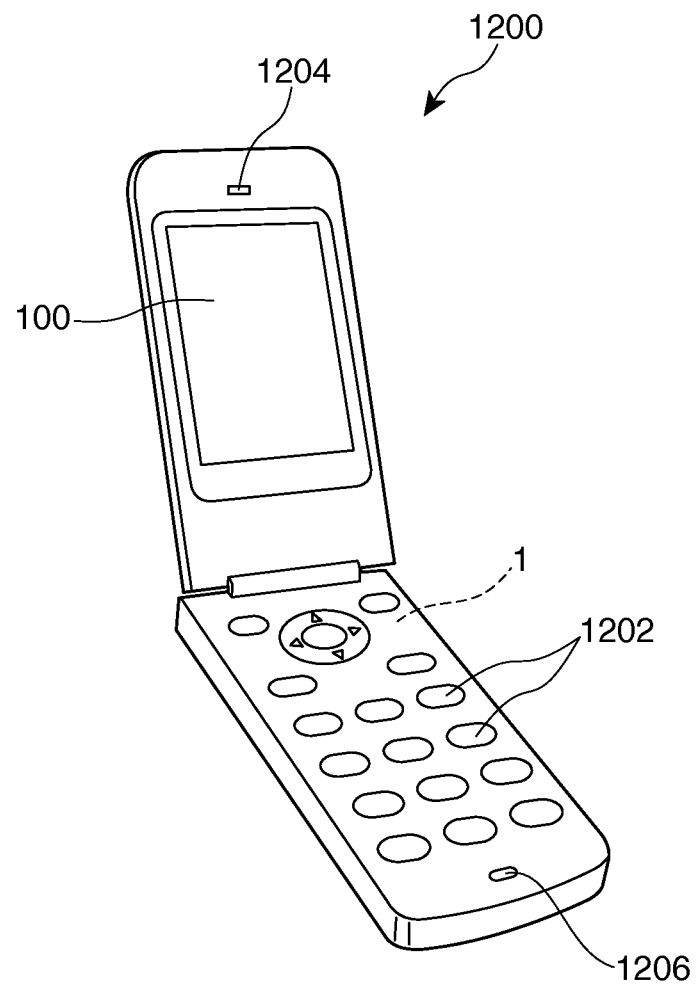
FIG. 19 is a perspective view showing the configuration of a portable phone (including PHS) using an electronic apparatus in accordance with an aspect of the invention.

FIG. 19 is a perspective view showing the structure of a portable phone (including a PHS) 1200 in which an electronic apparatus in accordance with an embodiment of the invention is implemented. As illustrated in the figure, the portable phone 1200 has plural operation buttons 1202, a receiver 1204 and a mouthpiece 1206, and a display section 100 disposed between the operation buttons 1202 and the receiver 1204. The sensor device 1 described above that functions as a gyro sensor is built in the portable telephone 1200.

Figure 20:
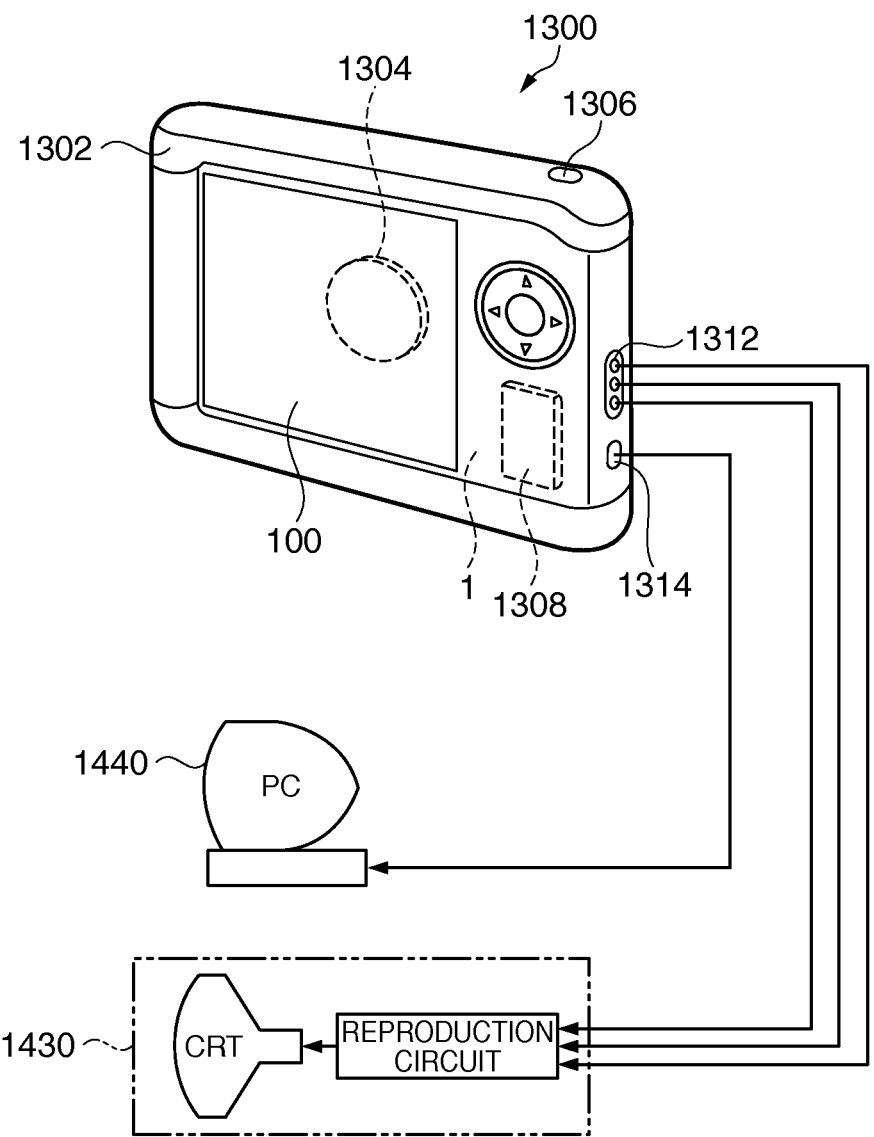
FIG. 20 is a perspective view showing the configuration of a digital still camera using an electronic apparatus in accordance with an aspect of the invention.

FIG. 20 is a perspective view showing the structure of a digital still camera 1300 in which an electronic apparatus in accordance with an embodiment of the invention is implemented. The figure also schematically shows connections with external apparatuses. In contrast to an ordinary analogue camera that exposes a silver halide photographic film to an optical image of an object, the digital still camera 1300 photoelectrically converts an optical image of an object by an imaging element such as a CCD (Charge Coupled Device), thereby generating an imaging signal (a picture signal).

The digital still camera 1300 has a case (body) 1302. A display section is provided at the rear surface of the case, and is configured to display an image based on the imaging signal provided by the CCD. The display section functions as a viewfinder to display an electronic image of the object. Also, the case 1302 is provided on its front side with a photo detection unit 1304 including an optical lens (an imaging optical system), a CCD and the like.

When the user presses a shutter button 1306 while visually confirming an object image displayed on the display section, imaging signals of the CCD at the moment are transmitted to and stored in a memory 1308. The digital still camera 1300 also includes video-signal output terminals 1312 and a data-communication input/output terminal 1314 on a side of the case 1302. As shown in the figure, the video-signal output terminals 1312 are connected to a monitor 1430, and the data-communication input/output terminal 1314 to a personal computer 1440, respectively, according to the necessity. With a predetermined operation, the imaging signals can be fed from the memory 1308 to the monitor 1430 and the personal computer 1440. The sensor device 1 described above that functions as a gyro sensor is built in the digital still camera 1300.

In addition to the personal computer (mobile personal computer) in FIG. 18, the portable phone in FIG. 19, and the digital still camera in FIG. 20, examples of electronic apparatuses in accordance with embodiments of the invention include, for example, self-position detection devices in vehicles, pointing devices, head-mount display devices, ink-jet devices (for example, ink jet printers), laptop personal computers, televisions, video cameras, video-tape recorders, car navigation systems, pagers, electronic organizers (with or without communications capabilities), electronic dictionaries, calculators, electronic game machines, gaming controllers, word processors, workstations, video phones, security monitors, electronic binoculars, POS terminals, medical equipment (such as electronic thermometers, blood pressure meters, blood glucose meters, electrocardiographic equipment, ultrasonic diagnostic equipment, and electronic endoscopes), fish finders, a variety of measuring equipment, a variety of instruments (such as those used for cars, aircrafts, and ships), flight simulators and the like.

Although the sensor elements, methods for adjusting characteristics of the sensor element, sensor devices and electronic apparatuses in accordance with the embodiments of the invention have been described above with reference to the drawings, the invention is not limited these embodiments.

It is noted that the configuration of each of the components in the sensor elements, sensor devices and electronic apparatuses in accordance with the embodiments of the invention can be replaced with any other configuration that exhibits similar functions, and may be additionally provided with any desired configuration. Also, for the sensor elements, sensor devices and electronic apparatuses in accordance with the embodiments of the invention, any arbitrary configurations in each of the embodiments described above may be combined together.

Also, any desired steps may be added to the method for adjusting characteristic of a sensor element in accordance with any one of the embodiments of the invention.

Also, in the embodiments described above, examples in which the invention is applied to H-letter shape tuning fork sensor elements have been described. However, the invention is also applicable to various other types of sensor elements (gyro elements), such as, double-T type, double-ended tuning fork type, trident tuning fork type, comb-tooth type, orthogonal type, and square beam type sensor elements. Also, the number of the drive vibration arms, the detection vibration arms, and the adjustment vibration arms may be one or three or more. Also, the drive vibration arms may also function as detection vibration arms.

The number, the position, the shape and the size of each of the drive electrodes are not limited to the embodiments described above, as long as the drive vibration arms can be vibrated by energization. The number, the position, the shape and the size of each of the detection electrodes are not limited to the embodiments described above, as long as vibration of the drive vibration arms caused by application of a physical quantity can be electrically detected. Also, the number, the position, the shape and the size of each of the adjustment electrodes are not limited to the embodiments described above, as long as charges generated in response to drive vibration of the adjustment vibration arms can be outputted.

The entire disclosure of Japanese Patent Application No. 2011-214427, filed Sep. 29, 2011 is expressly incorporated by reference herein.

What is claimed is:

1. A sensor element comprising:
a base part;
a drive vibration arm for drive-vibration that extends from the base part;
a vibration arm that extends from the base part and vibrates in response to drive-vibration of the drive vibration arm; and
a detection part including a detection electrode that outputs a signal according to a physical quantity applied to the drive vibration arm,
the vibration arm having an electrode that is electrically connected to the detection electrode and generates a charge in a reverse polarity with respect to a charge to be generated from the detection electrode when no physical quantity is applied to the drive vibration arm, and the electrode including a common part provided along an extension direction of the vibration arm and plural branch parts branching out from the common part.

2. The sensor element according to claim 1, wherein each of the plural branch parts has an electrode width greater on a side of a tip portion thereof than on a side of the common part.

3. The sensor element according to claim 1, wherein the plural branch parts have mutually different electrode areas.

4. The sensor element according to claim 1, wherein the plural branch parts are inclined with respect to the extension direction of the vibration arm.

5. The sensor element according to claim 1, wherein the plural branch parts branch out on both sides of the common part.

6. The sensor element according to claim 1, wherein the vibration arm has a first surface, a second surface on the opposite side of the first surface, and a side surface connecting the first surface and the second surface, and the electrode has the plural branch parts provided on at least one of the first surface and the second surface, and a side surface electrode provided on the side surface.

7. The sensor element according to claim 6, wherein the vibration arm has a groove portion provided along the extension direction thereof, and at least a portion of the plural branch parts is provided on a wall surface of the groove portion.

8. The sensor element according to claim 6, wherein the common part and the plural branch parts are provided on each of the first surface and the second surface, and the plural branch parts provided on the first surface and the plural branch parts provided on the second surface are arranged so as not to overlap each other in at least a portion thereof, as viewed in a normal direction to the first surface.

9. The sensor element according to claim 1, wherein the detection part has a detection vibration arm that extends from the base part, and vibrates according to a physical quantity applied to the drive vibration arm, and the detection electrode is provided on the detection vibration arm.

10. A method for manufacturing a sensor element, the sensor element including a base part; a drive vibration arm for drive vibration that extends from the base part; a vibration arm that extends from the base part and vibrates in response to drive vibration of the drive vibration arm; and a detection part including a detection electrode that outputs a signal according to a physical quantity applied to the drive vibration arm, the vibration arm having an electrode that is electrically connected to the detection electrode and generates a charge in a reverse polarity with respect to a charge to be generated from the detection electrode when no physical quantity is applied to the drive vibration arm, and the electrode including a common part provided along an extension direction of the vibration arm and plural branch parts branching out from the common part, the method comprising adjusting an amount of charge to be generated at the electrode by cutting the plural branch parts midway or the common part midway.

11. The method for manufacturing a sensor element according to claim 10, comprising, before performing the charge adjustment, measuring a charge generated at the detection electrode in a state in which the drive vibration arm is vibrated by energization without applying a physical quantity to the drive vibration arm, and adjusting a resonance frequency of the vibration arm.

12. A sensor device comprising: the sensor element recited in claim 1, a circuit for driving the drive vibration arm, and a circuit for detecting an output from the detection electrode.

13. An electronic apparatus comprising: the sensor element recited in claim 1.

* * * * *